United States Patent
Potenza et al.

(10) Patent No.: US 11,956,014 B2
(45) Date of Patent: Apr. 9, 2024

(54) METHOD AND SYSTEM FOR TRANSMITTING AND RECEIVING AN ELECTROMAGNETIC RADIATION BEAM WITH DETECTION OF ORBITAL ANGULAR MOMENTUM AND RELATED TELECOMMUNICATION METHOD AND SYSTEM

(71) Applicant: UNIVERSITA' DEGLI STUDI DI MILANO, Milan (IT)

(72) Inventors: Marco Potenza, Milan (IT); Bruno Paroli, Milan (IT); Mirko Siano, Milan (IT)

(73) Assignee: UNIVERSITA' DEGLI STUDI DI MILANO, Milan (IT)

( * ) Notice: Subject to any disclaimer, the term of this patent is extended or adjusted under 35 U.S.C. 154(b) by 0 days.

(21) Appl. No.: 17/603,085

(22) PCT Filed: Apr. 2, 2020

(86) PCT No.: PCT/IB2020/053150
§ 371 (c)(1),
(2) Date: Oct. 12, 2021

(87) PCT Pub. No.: WO2020/208485
PCT Pub. Date: Oct. 15, 2020

(65) Prior Publication Data
US 2022/0190916 A1 Jun. 16, 2022

(30) Foreign Application Priority Data
Apr. 12, 2019 (IT) .................. 102019000005706

(51) Int. Cl.
*H04B 10/118* (2013.01)
*G02F 2/00* (2006.01)
(Continued)

(52) U.S. Cl.
CPC ........... *H04B 10/118* (2013.01); *G02F 2/008* (2021.01); *H04B 7/18515* (2013.01);
(Continued)

(58) Field of Classification Search
CPC .. H04B 10/118; H04B 7/18515; H04B 10/11; H04B 10/541; H04B 10/50; H04B 10/40; G02F 2/008; H04J 14/02
See application file for complete search history.

(56) References Cited

U.S. PATENT DOCUMENTS

2012/0081120 A1* 4/2012 Elgort .................. G01R 33/282
324/322
2019/0198999 A1* 6/2019 Ashrafi .................. H01Q 25/04
(Continued)

*Primary Examiner* — Hibret A Woldekidan
(74) *Attorney, Agent, or Firm* — ArentFox Schiff LLP; Michael Fainberg

(57) ABSTRACT

A method for transmitting and receiving an electromagnetic radiation beam, adapted to determine an orbital angular momentum of the received electromagnetic radiation beam, is described. There is further described a system for transmitting and receiving an electromagnetic radiation beam, capable of performing the aforesaid method. A method for performing a telecommunication of signals modulated according to any modulation technique and grouped by means of orbital angular momentum multiplexing is further described. There is further described a telecommunication system capable of performing the aforesaid method for performing a telecommunication of modulated signals.

21 Claims, 6 Drawing Sheets

(51) Int. Cl.
    *H04B 7/185*     (2006.01)
    *H04B 10/11*     (2013.01)
    *H04B 10/54*     (2013.01)
    *H04J 14/02*     (2006.01)

(52) U.S. Cl.
    CPC ........... *H04B 10/11* (2013.01); *H04B 10/541* (2013.01); *H04J 14/02* (2013.01)

(56) References Cited

U.S. PATENT DOCUMENTS

| | | | | |
|---|---|---|---|---|
| 2020/0351007 | A1* | 11/2020 | Raymer | G02F 1/01 |
| 2021/0085814 | A1* | 3/2021 | Ashrafi | A61L 2/24 |
| 2022/0190915 | A1* | 6/2022 | Potenza | H04J 14/04 |
| 2022/0206150 | A1* | 6/2022 | Remesch | G01S 17/58 |

* cited by examiner

METHOD AND SYSTEM FOR TRANSMITTING AND RECEIVING AN ELECTROMAGNETIC RADIATION BEAM WITH DETECTION OF ORBITAL ANGULAR MOMENTUM AND RELATED TELECOMMUNICATION METHOD AND SYSTEM

CROSS-REFERENCE TO RELATED APPLICATIONS

This application is a National Phase Application of PCT International Application No. PCT/IB2020/053150, having an International Filing Date of Apr. 2, 2020 which claims priority to Italian Application No. 102019000005706 filed Apr. 12, 2019, each of which is hereby incorporated by reference in its entirety.

TECHNOLOGICAL BACKGROUND OF THE INVENTION

Field of Application

The present invention generally relates to the technical field of the transmission and reception of electromagnetic beams, in particular optical/laser and microwave beams, with detection of the orbital angular momentum of such beams, as well as to the field of telecommunications based on electromagnetic beams, in particular optical/laser and microwave beams, orbital angular momentum-modulated and/or -multiplexed.

Description of the Prior Art

The theory of the propagation of electromagnetic beams, in particular laser and microwave beams, has relatively recently shown the existence of an orbital angular momentum (Orbital Angular Momentum).

The orbital angular momentum, from a traditional point of view, is a concept related to the different transversal modes of beam propagation.

This may also be considered indicative of the fact that the propagation front of an Orbital Angular Momentum (OAM) wave is not simply planar, but has an evolution which may be represented by helical surfaces.

In other words, the Poynting vector, as well as the wave vector, is no longer simply parallel to the direction of propagation, but twists about it.

The orbital angular momentum is treated, from a quantum point of view, through a further quantum number, which is distinct from the spin.

Recently, beams having orbital angular momentums different from 0, and capable of taking different values, have also been experimentally demonstrated.

The "orbital angular momentum" variable, due to the features thereof mentioned above, is particularly difficult to be detected and characterized when the detector is illuminated only by a limited portion of the radiation beam, even if very distant from the singularity. In fact, there are no reliable systems and methods allowing to detect the orbital angular momentum of an electromagnetic beam, for example, a laser, received by means of a local measure, i.e., having available only a limited portion of the beam incident on the detector, even if very distant from the singularity.

On the other hand, the need is felt to detect the orbital angular momentum of a beam received for various reasons, including, for example, the characterization of the beam and the utilization of the angular momentum variable for telecommunications purposes.

Such a need is not currently met by known technical solutions through local measures.

The Applicant has also identified a promising possibility of utilizing the orbital angular momentum variable as an additional degree of freedom, advantageously usable both for modulating signals and for multiplexing the same.

However, the background art in the technical field taken into consideration does not offer reliable telecommunications solutions based on orbital angular momentum multiplexing and/or modulation. The need to for such solutions is therefore particularly felt.

SUMMARY OF THE INVENTION

In light of the above, it is the object of the present invention to provide a method for transmitting and receiving an electromagnetic radiation beam, adapted to determine an orbital angular momentum of the received electromagnetic radiation beam, such as to allow to at least partially obviate the drawbacks complained herein above with reference to the prior art, and to fulfill the above mentioned needs particularly felt in the technical field taken into consideration.

Such an object is achieved by a method according to claim 1.

Further embodiments of such a method are defined by claims 2-15.

The present invention further relates to a system for transmitting and receiving an electromagnetic radiation beam, capable of performing the aforesaid method. Such a system is defined in claims 23 and 24.

The present invention also relates to a method for performing a telecommunication of signals modulated according to any modulation technique and grouped by means of orbital angular momentum multiplexing. Such a method is defined in claim 16.

Further embodiments of such a method are defined by claims 17-22.

The present invention further relates to a telecommunication system, capable of performing the aforesaid method for performing a telecommunication of modulated signals. Such a system is defined in claims 25 and 26.

BRIEF DESCRIPTION OF THE DRAWINGS

Further features and advantages of the aforesaid methods and systems according to the invention will become apparent from the following description of preferred embodiments, given by way of indicative and non-limiting examples, with reference to the accompanying drawings, in which.

DETAILED DESCRIPTION

Figure 1:
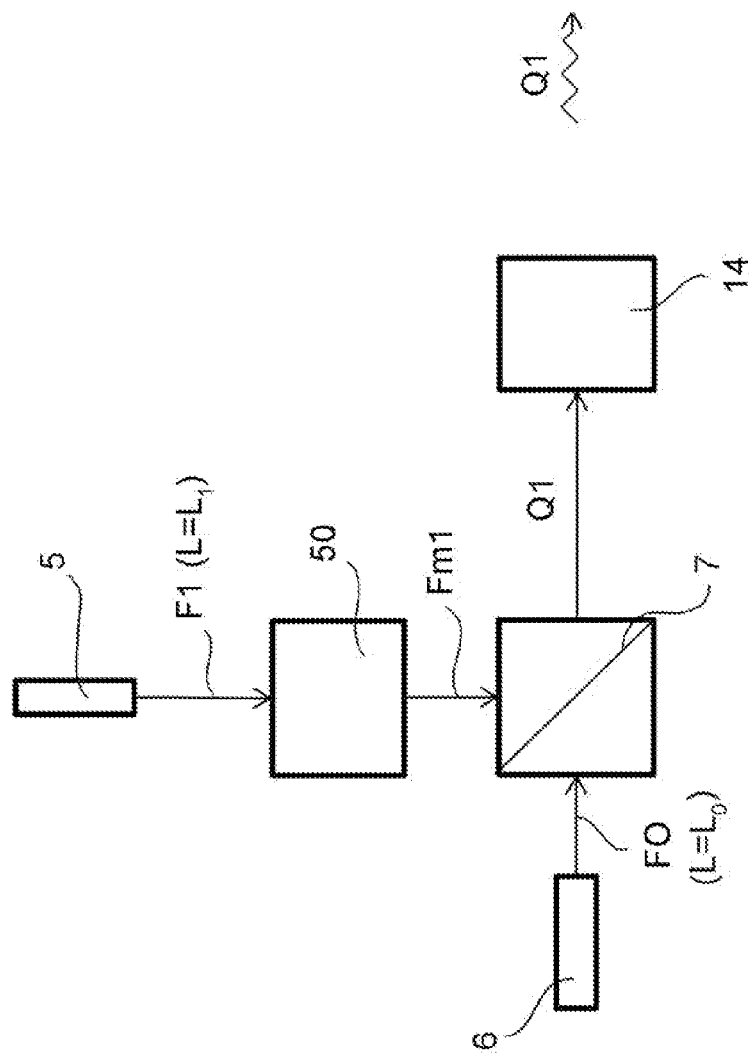
FIG. 1 shows a simplified diagram of a transmitting portion of an embodiment of the system for transmitting and receiving an electromagnetic radiation beam, in accordance with the invention; such a FIG. 1 simultaneously shows some steps of the corresponding method.

With reference to FIGS. 1 to 6, a method for transmitting and receiving an electromagnetic radiation beam is described, adapted to determine an orbital angular momentum of the received electromagnetic radiation beam.

The method, first of all, comprises the steps of generating at least one main electromagnetic radiation beam F1 characterized by a first orbital angular momentum $L_1$, by a first spectrum in a first frequency band, and by a first beam radius of curvature, and of generating a reference electromagnetic radiation beam F0, characterized by a second orbital angular momentum $L_0$, by a second spectrum in a second frequency band which is distinct from the aforesaid first frequency band, and by a second beam radius of curvature substantially coinciding with the aforesaid first beam radius of curvature.

It should be noted that the aforesaid characterization based on a first $L_1$ and a second orbital angular momentum $L_0$ may be correspondingly described also in terms of topological charge $(l_1, l_0)$, since an angular momentum L and a topological charge l are linked by the relationship:

$$L = (l*h)/2\pi \text{ (where h is the Planck constant).}$$

The method therefore involves generating a composite electromagnetic radiation beam Q1, consisting of the superposition of the aforesaid at least one main beam F1 and reference beam F0, and transmitting the composite electromagnetic radiation beam Q1 thus generated.

The method further comprises the steps of receiving the aforesaid composite electromagnetic radiation beam Q1, by means of a first beam detector 1 located in a first position, to generate a first composite beam electrical signal D1, representative of the electric and/or magnetic field and/or of the intensity of the electromagnetic radiation of the composite beam in such a first position; and receiving the aforesaid composite electromagnetic radiation beam Q1, by means of a second beam detector 2 located in a second different position with respect to the aforesaid first position, to generate a second composite beam electrical signal D2, representative of the electric and/or magnetic field and/or of the intensity of the received electromagnetic radiation of the composite beam in such a second position.

The method further comprises the steps of performing a frequency discrimination of the first composite beam electrical signal D1 to obtain a first main beam electrical signal P1, representative of the electric and/or magnetic field and/or of the intensity due to the main beam in said first position, and a first reference beam electrical signal R1, representative of the electric and/or magnetic field and/or of the intensity due to the reference beam in the first position; and performing a frequency discrimination of the second composite beam electrical signal D2 to obtain a second main beam electrical signal P2, representative of the electric and/or magnetic field and/or of the intensity due to the main beam in the second position, and a second reference beam electrical signal R2, representative of the electric and/or magnetic field and/or of the intensity due to the reference beam in the second position.

The method finally involves determining the orbital angular momentum $L_1$ of the main electromagnetic radiation beam and/or the spatial phase variation of the main electromagnetic radiation beam due to the main beam orbital angular momentum $L_1$, based on the aforesaid first main beam electrical signal P1, second main beam electrical signal P2, first reference beam electrical signal R1 and second reference beam electrical signal R2.

In accordance with an embodiment of the method, the step of determining comprises determining a first phase difference value ΔP corresponding to the difference between the phase of the first main beam electrical signal P1 and the phase of the second main beam electrical signal P2; furthermore, determining a second phase difference value ΔR corresponding to the difference between the phase of the first reference beam electrical signal R1 and the phase of the second reference beam electrical signal R2; then, subtracting the second phase difference value ΔR, divided by a second wave number k', from the first phase difference value ΔP, divided by a first wave number k, to obtain a difference value (Q2=ΔP/k−ΔR/k') which is independent of positional inclination conditions between the aforesaid first detector and second detector, deriving from the relative position of the two detectors with respect to the beam propagation, said difference value being independent of phase variations due to disturbances suffered by the transmitted composite beam before reception; and determining then the orbital angular momentum of the main electromagnetic radiation beam based on the aforesaid obtained difference value (Q2=ΔP/k−ΔR/k'.

The first wave number k is the wave number corresponding to the main beam, defined as k=2π/λ, λ being the wavelength of the aforesaid main beam belonging to the aforesaid first frequency band. The second wave number k' is the wave number corresponding to the reference beam, defined as k'=2π/λ', λ' being the wavelength of the aforesaid reference beam belonging to the aforesaid second frequency band.

The definition "positional inclination" (or "positional tilt") is meant to indicate the angle formed between the straight line joining the two detectors and the (orthogonal) projection thereof on the plane orthogonal to the beam propagation axis.

In accordance with a particular implementation example, the step of determining the orbital angular momentum of the main electromagnetic radiation beam comprises determining the orbital angular momentum of the main electromagnetic radiation beam based on the formula:

$$\Delta P/k - \Delta R/k' \propto (L_1/k - L_0/k')(\theta_2 \theta_1)$$

where $\theta_1$ is the angular position of the first detector measured on the plane orthogonal to the composite beam propagation vector containing the first detector; $\theta_2$ is the angular position of the second detector measured on the plane orthogonal to the composite beam propagation vector containing the second detector; ∝ indicates proportionality.

In accordance with an implementation option, the step of determining a first phase difference value ΔP comprises comparing the phase of the first main beam electrical signal P1 with the phase of the second main beam electrical signal P2, by means of a first phase comparator 3; the step of determining a second phase difference value ΔR comprises comparing the phase of the first reference beam electrical signal R1 with that of the second reference beam electrical signal R2, by means of a second phase comparator 4.

In accordance with another implementation option, the step of determining a first phase difference value ΔP comprises performing correlation operations between the first main beam electrical signal P1 and the second main beam electrical signal P2; and the step of determining a second phase difference value ΔR comprises performing correlation operations between the first reference beam electrical signal R1 and the second reference beam electrical signal R2.

In accordance with an embodiment of the method, the orbital angular momentum of the reference beam is known at all times.

In accordance with an implementation option, the orbital angular momentum of the reference beam takes the constant value $L_0=0$.

In accordance with an embodiment of the method, the first position of the first detector 1 and the second position of the second detector 2 are fixed and constant, and are distinct from the position of the singularity point of the beam.

In accordance with another embodiment of the method, the first position of the first detector 1 and/or the second position of the second detector 2 are movable, and the reciprocal relationship between the aforesaid first position and second position is known at all times.

In accordance with an implementation option, the second frequency band is substantially monochromatic.

In accordance with a particular implementation option, the second frequency band is adjacent to the first frequency band.

In accordance with possible embodiments of the method, the steps of performing a frequency discrimination of the first or second composite beam electrical signal comprise performing a frequency filtering, or performing a frequency separation by means of heterodyne techniques or other frequency separation methods.

In accordance with an embodiment of the method, the at least one main electromagnetic radiation beam is not modulated.

In accordance with other embodiments of the method, the at least one main electromagnetic radiation beam is amplitude-modulated, and/or phase-modulated, and/or frequency-modulated, and/or orbital angular momentum-modulated.

In accordance with an embodiment of the method, all the transmitted and received electromagnetic beams, previously mentioned, are optical beams and/or laser beams.

In the following, a detailed example of implementation of the method is given, with the relevant physical-mathematical analysis.

In the following description, and in FIGS. 1 and 2, the points in which the different signals are present (first composite beam electrical signal D1, second composite beam electrical signal D2, first main beam electrical signal P1, first reference beam electrical signal R1, second main beam electrical signal P2, second reference beam electrical signal of) are indicated, for simplicity, with the same name as the respective signal.

As already observed, the composite beam Q1 is generated by at least one beam with an orbital angular momentum $L=L_1$ (other than 0), defined herein as main beam F1, superimposed on a beam with an angular momentum $L=L_0$, defined herein as reference beam F0.

The main beam may be modulated or unmodulated. The reference beam has a frequency band which is not overlapping the frequency band of the main beam. The frequency band of the reference beam is preferably quasi-monochromatic and adjacent to the frequency band of the main beam.

The reference beam substantially has the same curvature and the same propagation vector as the main beam. The reference beam preferably has a topological charge $l_0=0$, which also implies an orbital angular momentum $L_0=0$.

The recognition of the spatial phase difference generated by the main beam with an orbital angular momentum $L_1$ is obtained by using two detectors in positions arbitrary in the space with the exception of the singularity point of the vortex.

As known, the expression "singularity of the vortex" means a point in the vortex in which the electromagnetic field results to be reduced to zero and in which the phase of the field cannot be determined.

In case the main beam is not modulated, the electric field $E_1$ or the related signal on the first detector 1 (indicated as D1 in FIG. 2) may be represented by the following analytical formula:

$$E(\vec{x}_1,t)=A_1 e^{i\omega t}e^{il_1\theta_1}e^{i\varphi(\vec{x}_1)}e^{i\alpha(\vec{x}_1)}+\\ B_1 e^{i\omega' t}e^{il_0\theta_1}e^{i\varphi'(\vec{x}_1)}e^{i\alpha'(\vec{x}_1)}$$

where t is time, $A_1$ and $B_1$ are non-zero arbitrary amplitudes, $l_1$ is the topological charge of the main beam, $l_0$ is the topological charge of the reference beam, $\theta_1$ is the angular position of the detector measured on the plane orthogonal to the composite beam propagation vector containing the first detector 1, $\varphi(\vec{x}_1)$ and $\varphi'(\vec{x}_1)$ are arbitrary phases due to the positional inclination, and $\alpha(\vec{x}_1)$ and $\alpha'(\vec{x}_1)$ are arbitrary phases due to disturbances of the propagating wavefront.

Similarly, the electric field $E_2$ or the related signal on the second detector 2 (indicated as D2 in FIG. 2) may be represented by the following analytical formula:

$$E(\vec{x}_2,t)=A_2 e^{i\omega t}e^{il_1\theta_2}e^{i\varphi(\vec{x}_2)}e^{i\alpha(\vec{x}_2)}+\\ B_2 e^{i\omega' t}e^{il_0\theta_2}e^{i\varphi'(\vec{x}_2)}e^{i\alpha'(\vec{x}_2)}$$

where t is time, $A_2$ and $B_2$ are non-zero arbitrary amplitudes, $l_1$ is the topological charge of the main beam, $l_0$ is the topological charge of the reference beam, $\theta_2$ is the angular position of the detector 2 measured on the plane orthogonal to the composite beam propagation vector containing the detector 2, $\varphi(\vec{x}_2)$ and $\varphi'(\vec{x}_2)$ are arbitrary phases due to the positional inclination, and $\alpha(\vec{x}_2)$ and $\alpha'(\vec{x}_2)$ are arbitrary phases due to disturbances of the propagating wavefront.

Figure 6:
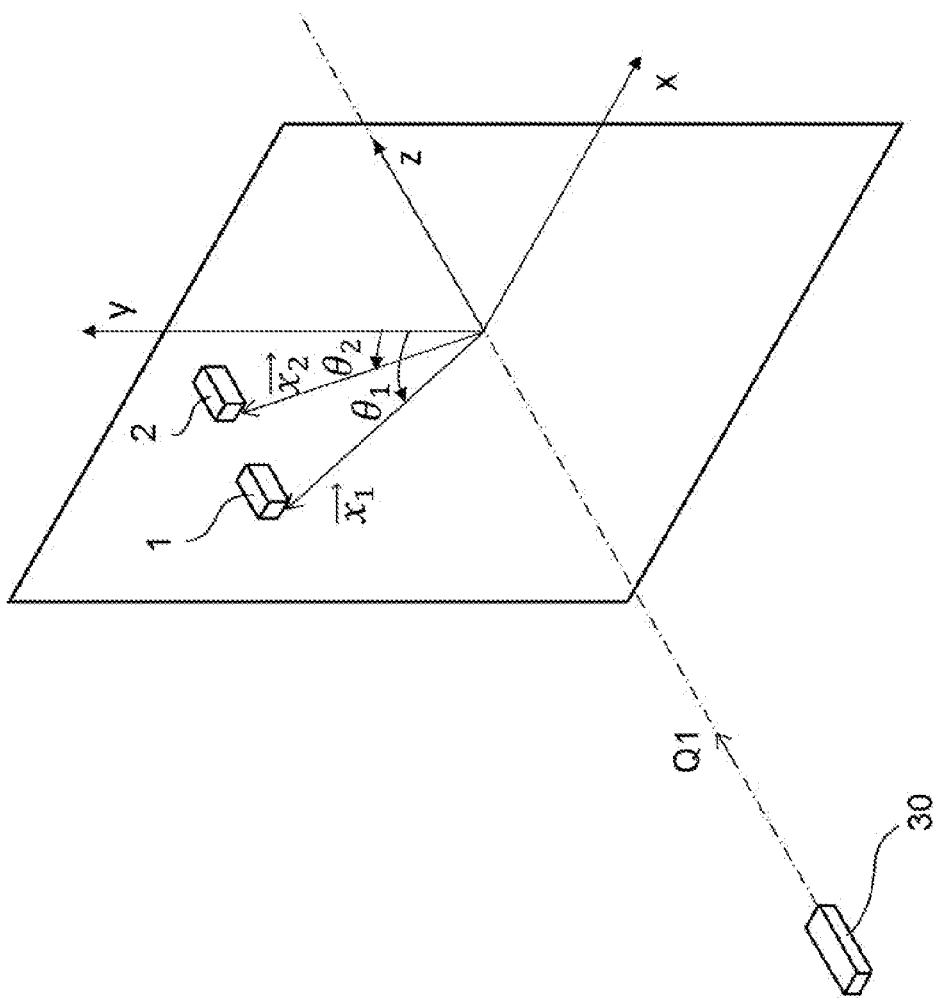
FIG. 6 depicts some geometric quantities used in the illustration of the system.

As a further illustration of the geometric quantities defined above, FIG. 6 shows, by means of a dashed line, the propagation axis z of the composite beam Q1 generated by the composite beam generation system, already previously described (indicated in FIG. 6 with reference 30). FIG. 6 also indicates the plane xy orthogonal to the propagation axis z, the position vectors $\vec{x}_1$ and $\vec{x}_2$ of the two detectors 1 and 2, respectively, and the aforesaid angular positions of the two detectors $\theta_1$ and $\theta_2$, respectively.

The field or the related signal is separated in frequency by means of various possible techniques, which are known per se, so as to have in R1 and R2 the fields or the related signals in the frequency band of the reference beam only, and in P1 and P2 the fields or the related signals in the frequency band of the main beam only.

The following analytical expressions may therefore be obtained:

in R1: $E(\vec{x}_1,t)=B_1 e^{i\omega' t}e^{il_0\theta_1}e^{i\varphi'(\vec{x}_1)}e^{i\alpha'(\vec{x}_1)}$ in R2: $E(\vec{x}_2,t)=B_2 e^{i\omega' t}e^{il_0\theta_2}e^{i\varphi'(\vec{x}_2)}e^{i\alpha'(\vec{x}_2)}$ in P1: $E(\vec{x}_1,t)=A_1 e^{i\omega t}e^{il_1\theta_1}e^{i\varphi(\vec{x}_1)}e^{i\alpha(\vec{x}_1)}$ in P2: $E(\vec{x}_2,t)=A_2 e^{i\omega t}e^{il_1\theta_2}e^{i\varphi(\vec{x}_2)}e^{i\alpha(\vec{x}_2)}$ The second phase comparator 4 provides a quantity proportional to the phase difference of the fields and of the related signals between R1 and R2:

$$\Delta R \propto l_0(\theta_2-\theta_1)+\varphi'(\vec{x}_2)-\varphi'(\vec{x}_1)+\alpha'(\vec{x}_2)-\alpha'(\vec{x}_1) \quad 5$$

The first phase comparator 3 provides a quantity proportional to the phase difference of the fields and of the related signals between P1 and P2:

$$\Delta P \propto l_1(\theta_2-\theta_1)+\varphi(\vec{x}_2)-\varphi(\vec{x}_1)+\alpha(\vec{x}_2)-\alpha(\vec{x}_1)$$

Since the main beam has a curvature substantially equal to the reference beam curvature and a propagation direction substantially coinciding with the reference beam propagation direction, the phase difference related to the inclinations (tilts) is, with an excellent approximation:

$$\frac{\varphi(\vec{x}_2)}{k} - \frac{\varphi(\vec{x}_1)}{k} = \frac{\varphi'(\vec{x}_2)}{k'} - \frac{\varphi'(\vec{x}_1)}{k'}$$

Since the distortion phenomena due to the propagation are very similar for the main beam and the reference beam (superimposed upon transmission in the composite beam), the phase difference related to the distortion is, with an excellent approximation:

$$\frac{\alpha(\vec{x}_2)}{k} - \frac{\alpha(\vec{x}_1)}{k} = \frac{\alpha'(\vec{x}_2)}{k'} - \frac{\alpha'(\vec{x}_1)}{k'}$$

Furthermore, the proportionality constants of the two phase comparators may be selected so that they coincide.

Based on the above, it follows that the signal Q2 provides a quantity proportional to the difference:

$$\frac{\Delta P}{k} - \frac{\Delta R}{k'} \propto \left(\frac{l_1}{k} - \frac{l_0}{k'}\right)(\theta_2 - \theta_1)$$

Such a quantity is, as desired, independent of the positional inclination and of the disturbances due to the propagation.

Once the value of Q2 (i.e., $\Delta P/k - \Delta R/k'$) has been measured, being $\theta_1$, $\theta_2$, k, k' and the value of $l_0$ (topological charge of the reference beam, which may be set initially) known, the topology charge value $l_1$ of the main beam is easily obtained from the aforesaid formula, and therefore also the orbital angular momentum $L_1$ of the main beam, keeping in mind that:

$$L=(l*h)/2\pi.$$

If the main beam is phase-modulated, the equations at points R1, R2, P1, P2 become:

in R1: $E(\vec{x}_1,t)=B_1 e^{i\omega't} e^{il_0\theta_1} e^{i\varphi'(\vec{x}_1)} e^{i\alpha'(\vec{x}_1)}$ in R2: $E(\vec{x}_2,t)=B_2 e^{i\omega't} e^{il_0\theta_2} e^{i\varphi'(\vec{x}_2)} e^{i\alpha'(\vec{x}_2)}$ in P1: $E(\vec{x}_1,t)=A_1 e^{i\omega t+i\delta(t)} e^{il_1\theta_1} e^{i\varphi(\vec{x}_1)} e^{i\alpha(\vec{x}_1)}$ in P2: $E(\vec{x}_2,t)=A_2 e^{i\omega t+i\delta(t)} e^{il_1\theta_2} e^{i\varphi(\vec{x}_2)} e^{i\alpha(\vec{x}_2)}$ where $\delta(t)$ is the time-varying phase term due to the phase modulation equally detected on the first and second detectors. Since the phase term $\delta(t)$ compensates at the output of the second phase comparator 2, the following is also obtained:

$$\frac{\Delta P}{k} - \frac{\Delta R}{k'} \propto \left(\frac{l_1}{k} - \frac{l_0}{k'}\right)(\theta_2 - \theta_1)$$

If the main beam is frequency-modulated, the equations at points R1, R2, P1, P2 become:

in R1: $E(\vec{x}_1,t)=B_1 e^{i\omega't} e^{il_0\theta_1} e^{i\varphi'(\vec{x}_1)} e^{i\alpha'(\vec{x}_1)}$ in R2: $E(\vec{x}_2,t)=B_2 e^{i\omega't} e^{il_0\theta_2} e^{i\varphi'(\vec{x}_2)} e^{i\alpha'(\vec{x}_2)}$ in P1: $E(\vec{x}_1,t)=A_1 e^{i[\omega t+k_f\int_0^t m(\tau)d\tau]} e^{il_1\theta_1} e^{i\varphi(\vec{x}_1)} e^{i\alpha(\vec{x}_1)}$ in P2: $E(\vec{x}_2,t)=A_2 e^{i[\omega t+k_f\int_0^t m(\tau)d\tau]} e^{il_1\theta_2} e^{i\varphi(\vec{x}_2)} e^{i\alpha(\vec{x}_2)}$ where $m(\tau)$ is the modulating signal over time and $k_f$ is a constant. Since the term $k_f\int_0^t m(\tau)d\tau$ compensates at the output of the second phase comparator, the following will still be obtained:

$$\frac{\Delta P}{k} - \frac{\Delta R}{k'} \propto \left(\frac{l_1}{k} - \frac{l_0}{k'}\right)(\theta_2 - \theta_1)$$

A method is now described, also included in the invention, for performing a telecommunication of signals modulated according to any known modulation technique and grouped by means of orbital angular momentum variable multiplexing.

Such a method comprises the steps of generating a first electromagnetic radiation beam F1 characterized by a first orbital angular momentum $L_1$, and generating at least one second electromagnetic radiation beam F2 characterized by at least one respective second orbital angular momentum $L_2$. Both the first electromagnetic radiation beam F1 and the at least one second electromagnetic radiation beam F2 have respective spectra in the same first frequency band, and furthermore have respective radii of curvature substantially coinciding with a first beam radius-of-curvature value.

The method then involves modulating a first piece of information to be transmitted, represented by a first modulation function a(t), on the first electromagnetic radiation beam F1, by means of any modulation technique, to obtain a first modulated beam Fm1; furthermore, modulating at least one second piece of information to be transmitted, represented by a second modulation function b(t), on the at least one second electromagnetic radiation beam F2, by means of any modulation technique, to obtain a second modulated beam Fm2; then, generating a reference electromagnetic radiation beam F0, characterized by a second orbital angular momentum $L_0$, a second spectrum in a second frequency band which is distinct from the aforesaid first frequency band, and a second beam radius of curvature having a value substantially coinciding with the aforesaid first beam radius-of-curvature value.

The method then comprises the step of superimposing and/or combining the aforesaid reference beam F0, first modulated beam Fm1 and second modulated beam Fm2 to generate a composite electromagnetic radiation beam Q1, consisting of the superposition of the reference beam F0 and a main beam, in turn consisting of the superposition of the aforesaid first modulated beam Fm1 and at least one second modulated beam Fm2.

The method then comprises the step of transmitting the generated composite electromagnetic radiation beam Q1.

The method then includes receiving the aforesaid composite electromagnetic radiation beam, by means of a first beam detector 1 located in a first position, to generate a first composite beam electrical signal D1, representative of the electric and/or magnetic field and/or of the intensity of the electromagnetic radiation of the composite beam in the aforesaid first position; and receiving the aforesaid composite electromagnetic radiation beam, by means of a second beam detector 2 located in a second different position with respect to the first position, to generate a second composite beam electrical signal D2, representative of the electric and/or magnetic field and/or of the intensity of the received electromagnetic radiation of the composite beam in said second position.

The method further comprises the steps of performing a frequency discrimination of the first composite beam electrical signal D1 to obtain a first main beam electrical signal P1, representative of the electric and/or magnetic field and/or of the intensity due to the main beam in the first position, and a first reference beam electrical signal R1, representative of the electric and/or magnetic field and/or of the intensity due to the reference beam in the first position; and performing a frequency discrimination of the second composite beam electrical signal D2 to obtain a second main beam electrical signal P2, representative of the electric and/or magnetic field and/or of the intensity due to the main beam in the second position, and a second reference beam electrical signal R2, representative of the electric and/or magnetic field and/or of the intensity due to the reference beam in the second position.

The method further involves determining the phase of the first main beam electrical signal P1 and the phase of the second main beam electrical signal P2; furthermore, determining the phase of the first reference beam electrical signal R1 and the phase of the second reference beam electrical signal R2; then, determining a first phase difference value $\Delta P_{ab}$ corresponding to the difference between the phase of the first main beam electrical signal P1 and the phase of the second main beam electrical signal P2, in which such a first phase difference value $\Delta P_{ab}$ is dependent on the values taken by the first modulation function a(t) and the second modulation function b(t); furthermore, determining a second phase difference value $\Delta R$ corresponding to the difference between the phase of the first reference beam electrical signal R1 and the phase of the second reference beam electrical signal R2.

The method then comprises the steps of subtracting the second phase difference value $\Delta R$, divided by a second wave number k', from the first phase difference value $\Delta P_{ab}$, divided by a first wave number k, to obtain a difference value (Q2=$\Delta P_{ab}$/k−$\Delta R$/k'). The first wave number k is the wave number corresponding to the main beam, defined as k=$2\pi/\lambda$, $\lambda$ being the wavelength of the aforesaid main beam belonging to the aforesaid first frequency band. The second wave number k' is the wave number corresponding to the reference beam, defined as k'=$2\pi/\lambda'$, $\lambda'$ being the wavelength of the aforesaid reference beam belonging to the aforesaid second frequency band.

The aforesaid difference value Q2 is representative of a combination of values taken by the first modulation function a(t) and the second modulation function b(t), while it is independent of positional inclination conditions between the first detector 1 and the second detector 2 and independent of phase variations due to disturbances suffered by the transmitted composite beam before reception.

The method finally involves demultiplexing and demodulating the information modulated on each of the first modulated beam Fm1 and the at least one second modulated beam Fm2, based on the aforesaid determined difference value (Q2=$\Delta P_{ab}$/k−$\Delta R$/k').

In accordance with an embodiment of such a method, the number of modulated beams which are orbital angular momentum-multiplexed is greater than two.

In accordance with an embodiment of such a method, the first electromagnetic radiation beam F1 and the at least one second electromagnetic radiation beam F2 are digitally amplitude-modulated, in accordance with the amplitudes of the first modulation function a(t) and the at least one second modulation function b(t).

In this case, the difference value (Q2=$\Delta P_{ab}$/k−$\Delta R$/k') may take a plurality of expected values, each representative of a respective combination of digital amplitude values taken by the first modulation function a(t) and the at least one second modulation function b(t).

In accordance with an implementation option, the first electromagnetic radiation beam F1 and the at least a second electromagnetic radiation beam F2 are digitally amplitude-modulated, in a binary manner, and the amplitudes of the first modulation function a(t) and the at least one second modulation function b(t) may take the logical values 0 or 1.

In this case, the method comprises the further step of detecting the received power or intensity Q3 (by means of a detector 16) corresponding to the first main beam electrical signal P1 or the second main beam electrical signal P2, and comparing the power or intensity received with a minimum threshold.

The determined difference (Q2=$\Delta P_{ab}$/k−$\Delta R$/k') may take a first expected value ($\Delta P_{10}$/k−$\Delta R$/k') which is dependent on the first angular momentum ($L_1$), or a second expected value ($\Delta P_{01}$/k−$\Delta R$/k') which is dependent on the second angular momentum ($L_2$), or a third expected value ($\Delta P_{11}$/k−$\Delta R$/k') which is dependent on a combination of the first and second angular momentums.

The step of demodulating, demultiplexing and demodulating the modulated information comprises: recognizing that the first modulated beam Fm1 carries information corresponding to 1 and the second modulated beam Fm2 carries information corresponding to 0 if the determined difference ($\Delta P_{ab}$/k−$\Delta R$/k') takes the aforesaid first expected value ($\Delta P_{10}$/k−$\Delta R$/k'); recognizing that the first modulated beam Fm1 carries information corresponding to 0 and the second modulated beam Fm2 carries information corresponding to 1 if the determined difference ($\Delta P_{ab}$/k−$\Delta R$/k') takes the aforesaid second expected value ($\Delta P_{01}$/k−$\Delta R$/k'); recognizing that the first modulated beam Fm1 carries information corresponding to 1 and the second modulated beam Fm2 carries information corresponding to 1 if the determined difference ($\Delta P_{ab}$/k−$\Delta R$/k') takes the aforesaid third expected value ($\Delta P_{11}$/k−$\Delta R$/k'); recognizing that the first modulated beam Fm1 carries information corresponding to 0 and the second modulated beam Fm2 carries information corresponding to 0 if the received power or intensity Q3 is lower than the aforesaid minimum threshold.

In accordance with another embodiment of such a method, the first electromagnetic radiation beam F1 and the at least one second electromagnetic radiation beam F2 are digitally modulated based on the angular momentum. In this case, the angular momentum of the first beam F1 may take two different discrete values based on a first modulation function a(t) and the angular momentum of the at least one second beam F2 may take two different discrete values based on a respective at least one second modulation function b(t).

The difference value ($Q2=\Delta P_{ab}/k-\Delta R/k'$) may take a plurality of expected values, each representative of a respective combination of digital amplitude values taken by the first modulation function a(t) and the at least a second modulation function b(t).

In accordance with an implementation option, the amplitudes of the first modulation function a(t) and the at least a second modulation function b(t) may take the logical values 0 or 1.

The determined difference ($\Delta P_{ab}/k-\Delta R/k'$) may take: a first expected value ($\Delta P_{10}/k-\Delta R/k'$) when the first modulation function a(t) takes a value 1 and the second modulation function takes a value 0; or a second expected value ($\Delta P_{01}/k-\Delta R/k'$) when the first modulation function a(t) takes a value 0 and the second modulation function takes a value 1; or a third expected value ($\Delta P_{11}/k-\Delta R/k'$) when the first modulation function a(t) takes a value 1 and the second modulation function takes a value 1; or a fourth expected value ($\Delta P_{00}/k-\Delta R/k'$) when the first modulation function a(t) takes a value 0 and the second modulation function takes a value 0.

In this case, the step of demodulating, demultiplexing and demodulating the modulated information comprises: recognizing that the first modulated beam Fm1 carries information corresponding to 1 and the second modulated beam Fm2 carries information corresponding to 0 if the determined difference ($\Delta P_{ab}/k-\Delta R/k'$) takes the first expected value ($\Delta P_{10}/k-\Delta R/k'$); recognizing that the first modulated beam Fm1 carries information corresponding to 0 and the second modulated beam Fm2 carries information corresponding to 1 if the determined difference ($\Delta P_{ab}/k-\Delta R/k'$) takes the second expected value ($\Delta P_{01}/k-\Delta R/k'$); recognizing that the first modulated beam Fm1 carries information corresponding to 1 and the second modulated beam Fm2 carries information corresponding to 1 if the determined difference ($\Delta P_{ab}/k-\Delta R/k'$) takes the third expected value ($\Delta P_{11}/k-\Delta R/k'$); recognizing that the first modulated beam Fm1 carries information corresponding to 0 and the second modulated beam Fm2 carries information corresponding to 0 if the determined difference ($\Delta P_{ab}/k-\Delta R/k'$) takes the fourth expected value ($\Delta P_{00}/k-\Delta R/k'$).

In accordance with an embodiment of such a method, the transmitted and received electromagnetic beams, mentioned above, are optical beams and/or laser beams.

In the following, a detailed implementation example of the telecommunication method described above is given, with the relevant physical-mathematical analysis.

In the following description, and in FIGS. 3 to 5, the points in which the different signals are present (first composite beam electrical signal D1, second composite beam electrical signal D2, first main beam electrical signal P1, first reference beam electrical signal R1, second main beam electrical signal P2 f, second reference beam electrical signal R2) are indicated, for simplicity, with the same name as the respective signal.

Figure 3:
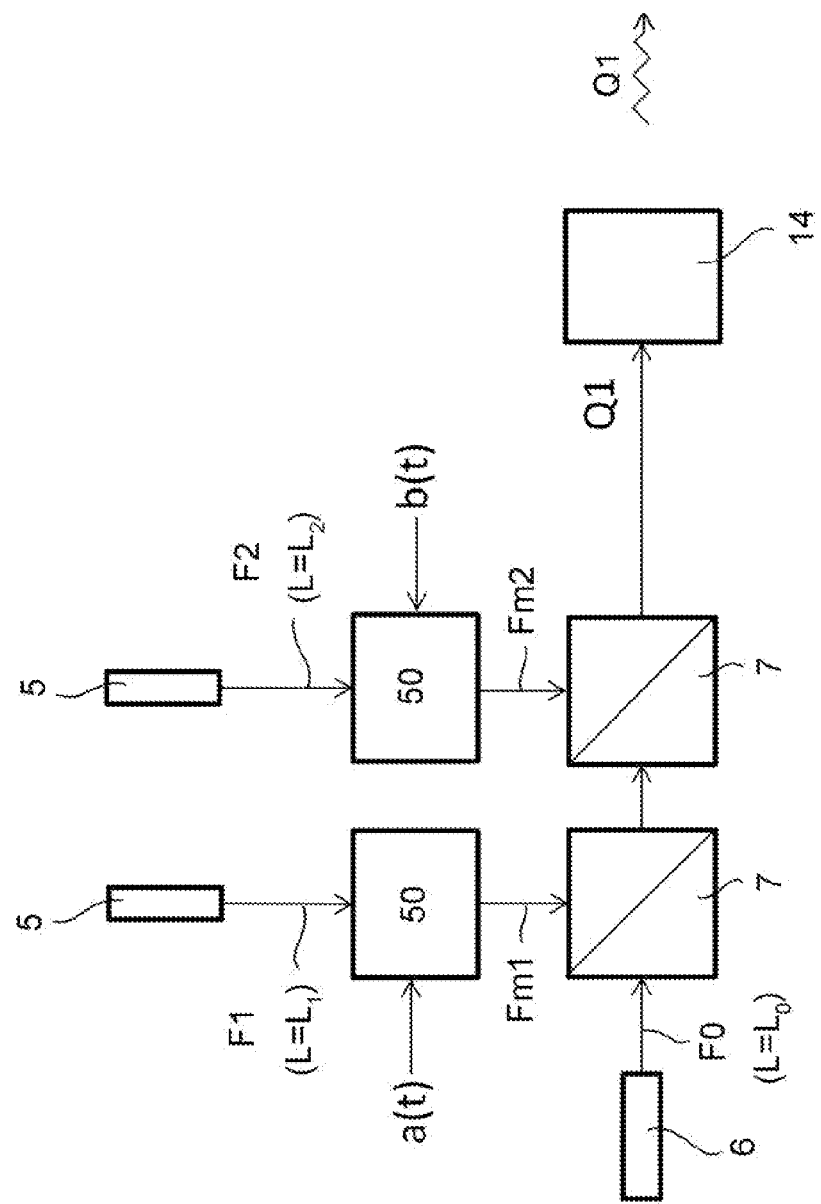
FIG. 3 shows a simplified diagram of a transmitting portion of an embodiment of the telecommunication system in accordance with the invention; such a FIG. 3 simultaneously shows some steps of the corresponding method.

A first beam with angular momentum $L_1$ (here defined as first main beam F1) and a second beam with angular momentum $L_2$ (here defined as second main beam F2) are superimposed on the reference beam with angular momentum $L_0$, as shown in FIG. 3. The two main beams have coinciding and/or overlapping frequency bands and are (in the example detailed herein) digitally amplitude-modulated. Furthermore, the two main beams have a substantially coinciding curvature.

The electric field, at the electrical signal D1, may be described by the following analytical formula:

$$E(\vec{x}_1,t)=A_1(t)e^{i\omega t}e^{il_1\theta_1}e^{i\varphi(\vec{x}_1)}e^{i\alpha(\vec{x}_1)}+C_1(t)e^{i\omega t}e^{il_2\theta_1}e^{i\varphi''(\vec{x}_1)}e^{i\alpha''(\vec{x}_1)}+B_1e^{i\omega' t}e^{il_0\theta_1}e^{i\varphi'(\vec{x}_1)}e^{i\alpha'(\vec{x}_1)}$$

where t is time, $A_1(t)$ and $C_1(t)$ are the amplitudes of the main beams varying over time, $B_1$ is the non-zero arbitrary amplitude of the reference beam, $l_1$ is the topological charge of the first main beam, $l_2$ is the topological charge of the second main beam, $l_0$ is the topological charge of the reference beam, $\theta_1$ is the angular position of the first detector measured on the plane orthogonal to the composite beam propagation vector containing the first detector 1, $\varphi(\vec{x}_1)$, $\varphi'(\vec{x}_1)$ and $\varphi''(\vec{x}_1)$ are arbitrary phases due to the positional inclination, while $\alpha(\vec{x}_1)$, $\alpha'(\vec{x}_1)$ and $\alpha''(\vec{x}_1)$ are arbitrary phases due to disturbances of the propagating wavefront.

The electric field, at the electrical signal D2, may be described by the following analytical formula:

$$E(\vec{x}_2,t)=A_2(t)e^{i\omega t}e^{il_1\theta_2}e^{i\varphi(\vec{x}_2)}e^{i\alpha(\vec{x}_2)}+C_2(t)e^{i\omega t}e^{il_2\theta_2}e^{i\varphi''(\vec{x}_2)}e^{i\alpha''(\vec{x}_2)}+B_2e^{i\omega' t}e^{il_0\theta_2}e^{i\varphi'(\vec{x}_2)}e^{i\alpha'(\vec{x}_2)}$$

where t is time, $A_2(t)$ and $C_2(t)$ are the amplitudes of the main beams varying over time, $B_2$ is the non-zero arbitrary amplitude of the reference beam, $l_1$ is the topological charge of the first main beam, $l_2$ is the topological charge of the second main beam, $l_0$ is the topological charge of the reference beam, $\theta_2$ is the angular position of the second detector measured on the plane orthogonal to the composite beam propagation vector containing the second detector 2, $\varphi(\vec{x}_2, t)$, $\varphi'(\vec{x}_2, t)$ and $\varphi''(\vec{x}_2, t)$ are arbitrary phases due to the positional inclination, while $\alpha(\vec{x}_2, t)$, $\alpha'(\vec{x}_2, t)$ and $\alpha''(\vec{x}_2, t)$ are arbitrary phases due to disturbances of the propagating wavefront.

As already observed above, the signals D1 and D2 are measured by means of two detectors, the reference beam is discriminated in frequency from the main beams, and the signals in R1, R2, P1, P2 are thus obtained using the following formulae:

in R1: $E(\vec{x}_1,t)=B_1e^{i\omega' t}e^{il_0\theta_1}e^{i\varphi'(\vec{x}_1)}e^{i\alpha'(\vec{x}_1)}$ in R2: $E(\vec{x}_2,t)=B_2e^{i\omega' t}e^{il_0\theta_2}e^{i\varphi'(\vec{x}_2)}e^{i\alpha'(\vec{x}_2)}$ in P1: $E(\vec{x}_1,t)=A_1(t)e^{i\omega t}e^{il_1\theta_1}e^{i\varphi(\vec{x}_1)}e^{i\alpha(\vec{x}_1)}+C_1(t)e^{i\omega t}e^{il_2\theta_1}e^{i\varphi''(\vec{x}_1)}e^{i\alpha''(\vec{x}_1)}$ in P2: $E(\vec{x}_2,t)=A_2(t)e^{i\omega t}e^{il_1\theta_2}e^{i\varphi(\vec{x}_2)}e^{i\alpha(\vec{x}_2)}+C_1(t)e^{i\omega t}e^{il_2\theta_2}e^{i\varphi''(\vec{x}_2)}e^{i\alpha''(\vec{x}_2)}$ In R1 and R2 there is only the reference beam, in P1 and P2 there are the superposed main beams.

The second phase comparator 4 provides a quantity proportional to the phase difference:

$$\Delta P \propto l_0(\theta_2-\theta_1)+\varphi'(\vec{x}_2)-\varphi'(\vec{x}_2)+\alpha'(\vec{x}_2)-\alpha'(\vec{x}_1)$$

In a digital modulation, the amplitudes may be written as $A_1=A_{1max}a(t)$, $A_2=A_{2max}a(t)$, $C_1=C_{1max}b(t)$, $C_2=C_{2max}b(t)$, where the functions a(t) and b(t) take values 0 or 1 depending on the information digitally modulated in the first and second modulators, respectively.

$A_{1max}$, $C_{1max}$ are the maximum amplitudes of the fields or of the signals representative of the main beams (first and second, respectively) received by the first detector; $A_{2max}$, $C_{2max}$ are the maximum amplitudes of the fields or of the signals representative of the main beams (first and second, respectively) received by the second detector. In the transmitter, it is possible to set the amplitudes of the main beams so that they are equal, i.e.:

$$A_{1max}=C_{1max}, A_{2max}=C_{2max}.$$

The first phase comparator 3 provides a quantity proportional to the phase difference between the fields or the signals in P1 and P2 which depends on the digital coding of the modulating functions a(t), b(t).

All possible combinations will now be considered.

When a(t)=0 and b(t)=0, the amplitudes of the main beams cancel each other out, and therefore the phase difference is indeterminable.

When a(t)=1 and b(t)=0, only the first main beam with angular momentum $L_1$ is there, and therefore a similar relationship to that already described above in the case of a single main beam applies:

$$\Delta P_{10} \propto l_1(\theta_2-\theta_1)+\varphi(\vec{x}_2)-\varphi(\vec{x}_1)+\alpha(\vec{x}_2)-\alpha(\vec{x}_1)$$

When a(t)=0 and b(t)=1, only the second main beam with angular momentum $L_2$ is there, and therefore a similar relationship to that already described above in the case of a single main beam applies:

$$\Delta P_{01} \propto l_2(\theta_2-\theta_1)+\varphi''(\vec{x}_2)-\varphi''(\vec{x}_1)+\alpha''(\vec{x}_2)-\alpha''(\vec{x}_1)$$

When a(t)=1 and b(t)=1, both the main beams are there, and therefore the following relationship holds:

$$\Delta P_{11} \propto \tfrac{1}{2}[(l_2 l_1)(\theta_2-\theta_1)+\varphi(\vec{x}_2)-\varphi(\vec{x}_1)+\alpha(\vec{x}_2)-\alpha(\vec{x}_1)+\varphi''(\vec{x}_2)-\varphi''(\vec{x}_1)+\alpha''(\vec{x}_2)-\alpha''(\vec{x}_1)]$$

Based on the above relationships, it is possible to calculate all the possible combinations of the modulating signals, so as to eliminate the arbitrariness of phase due to the positional inclinations and the wavefront distortions related to the propagation, similarly to what has already been described in the case of a single main beam.

In conclusion, the following relationships are therefore obtained.

When a(t)=0 and b(t)=0, the amplitudes of the main beams cancel each other out, and therefore the phase difference is indeterminable.

When a(t)=1 and b(t)=0, the following is obtained:

$$\frac{\Delta P_{10}}{k} - \frac{\Delta R}{k'} \propto \left(\frac{l_1}{k}-\frac{l_0}{k'}\right)(\theta_2-\theta_1)$$

When a(t)=0 and b(t)=1, the following is obtained:

$$\frac{\Delta P_{01}}{k} - \frac{\Delta R}{k'} \propto \left(\frac{l_2}{k}-\frac{l_0}{k'}\right)(\theta_2-\theta_1)$$

When a(t)=1 and b(t)=1, taking into account that also the main beams have a substantially coinciding curvature, the following is obtained:

$$\frac{\Delta P_{11}}{k} - \frac{\Delta R}{k'} \propto \left[\frac{1}{2}\left(\frac{l_2}{k}+\frac{l_1}{k}\right)-\frac{l_0}{k'}\right](\theta_2-\theta_1)$$

The aforesaid quantities ($\Delta P_{10}/k-\Delta R/k'$), ($\Delta P_{01}/k-\Delta R/k'$), ($\Delta P_{11}/k-\Delta R/k'$) may be easily made distinguishable, i.e., set at three different predefined known values, simply by suitably selecting the topological charges $l_0$, $l_1$, $l_2$ (i.e., the respective orbital angular momentums) of the reference beam and of the two main beams. Therefore such quantities, measured upon reception, are recognizable and indicative of the modulation values 0 or 1 applied to each of the two main beams. The information encoded thereon may therefore be decoded, i.e., demodulated and recognized.

Furthermore, advantageously, such quantities are made independent of the phase differences due to the positional inclinations and independent of the distortions of the propagating wavefront, which may be canceled by virtue of the presence of the reference beam (as already noticed above).

A possible example of a selection of values of the topological charges is:

$$l_0=0, l_1=0, l_2=2.$$

Other combinations are obviously detectable.

There is still to be recognized the status a(t)=0, b(t)=0, the phase of which is undetermined (as shown above). This status is easily identified since this is the only combination in which the amplitude of the fields or of the signals received for both the main beams is canceled. Therefore, the status a(t)=0, b(t)=0 is deterministically identified when the intensity or power of the signal detected at the point Q3 (by means of a detector 16 shown in FIG. 4) is below a predetermined threshold. Alternatively, both the first composite beam electrical signal D1 and the second composite beam electrical signal D2 may be monitored, in order to recognize the situation in which both signals are below a respective predefined threshold.

In the following, a detailed implementation example of the telecommunication method described above is given, based on orbital angular momentum modulation, with the relevant physical-mathematical analysis.

Angular momentum modulation may be described using arguments similar to those already developed for the digital amplitude modulation case.

The modulating functions a(t), b(t) take values 0 or 1 depending on the information digitally modulated in the first and second modulators, respectively. Such modulating functions determine a discrete variation of the angular momentum of the first electromagnetic radiation beam and of the at least one second electromagnetic radiation beam, respectively, depending on the binary value taken, i.e., $L_1$ and $L_2$ are functions dependent on the values taken by a(t) and b(t):

$$L_1=L_1(a(t)), L_2=L_2(b(t))$$

i.e., referring equivalently to topological charges: $l_1=l_1(a(t))$, $l_2=l_2(b(t))$.

As a result, the signals present in R1, R2, P1, P2 may be expressed as:

in R1: $E(\vec{x}_1,t)=B_1 e^{i\omega' t} e^{il_0\theta_1} e^{i\varphi'(\vec{x}_1)} e^{i\alpha'(\vec{x}_1)}$ in R2: $E(\vec{x}_2,t)=B_2 e^{i\omega' t} e^{il_0\theta_2} e^{i\varphi'(\vec{x}_2)} e^{i\alpha'(\vec{x}_2)}$ in P1: $E(\vec{x}_1,t)=$
$A_1 e^{i\omega t} e^{il_1(a(t))\theta_1} e^{i\varphi(\vec{x}_1)} e^{i\alpha(\vec{x}_1)}+$
$C_1 e^{i\omega t} e^{il_2(b(t))\theta_1} e^{i\varphi''(\vec{x}_1)} e^{i\alpha''(\vec{x}_1)}$ in P2: $E(\vec{x}_2,t)=$
$A_2 e^{i\omega t} e^{il_1(a(t))\theta_2} e^{i\varphi(\vec{x}_2)} e^{i\alpha(\vec{x}_2)}+$
$C_2 e^{i\omega t} e^{il_2(b(t))\theta_2} e^{i\varphi''(\vec{x}_2)} e^{i\alpha''(\vec{x}_2)}$ In R1 and R2 there is only the reference beam; in P1 and P2 there are the superposed main beams.

The second phase comparator 4 provides a quantity proportional to the phase difference (as in the general case):

$$\Delta R \propto l_0(\theta_2-\theta_1)+\varphi'(\vec{x}_2)-\varphi'(\vec{x}_1)+\alpha'(\vec{x}_2)-\alpha'(\vec{x}_1)$$

The first phase comparator 3 provides a quantity proportional to the phase difference between the fields or the signals in P1 and P2 which depends on the digital coding of the modulating functions a(t), b(t).

Considering all the possible combinations the following is obtained:

$$\Delta P_{ab} \propto \frac{1}{2}\big[(l_2(b(t)) + l_1(a(t))(\theta_2 - \theta_1) + \varphi(\vec{x}_2) -$$

$$\varphi(\vec{x}_1) + \alpha(\vec{x}_2) - \alpha(\vec{x}_1) + \varphi''(\vec{x}_2) - \varphi''(\vec{x}_1) + \alpha''(\vec{x}_2) - \alpha''(\vec{x}_1)\big].$$

where the combinations are determined by the indices a, b and by the corresponding values taken by the functions a(t), b(t).

The difference $\Delta P_{ab}/k - \Delta R/k'$ is then calculated for all the possible combinations of the modulating signals, so as to eliminate the arbitrariness of phase due to the positional inclinations and the wavefront distortions related to the propagation, by means of the formula:

$$\frac{\Delta P_{ab}}{k} - \frac{\Delta R}{k'} \propto \left[\frac{1}{2}\left(\frac{l_2(b(t))}{k} + \frac{l_1(a(t))}{k}\right) - \frac{l_0}{k'}\right](\theta_2 - \theta_1)$$

The topological charge values $l_0$, $l_1(0)$, $l_1(1)$, $l_2(0)$, $l_2(1)$, or the respective corresponding orbital angular momentums, may be selected so that the corresponding quantities ($\Delta P_{00}/k - \Delta R/k'$), ($\Delta P_{01}/k - \Delta R/k'$), ($\Delta P_{10}/k - \Delta R/k'$), ($\Delta P_{11}/k - \Delta R/k'$), are different from each other and therefore recognizable, allowing to decode (demodulate) the coded (modulated) information.

Furthermore, the aforesaid quantities are independent of the phase differences due to the positional inclinations and distortions of the propagating wavefront, which may be eliminated by virtue of the presence of the reference beam.

An example of topological charge value choice is $l_0=0$, $l_1(0)=0$, $l_1(1)=1$, $l_2(0)=0$, $l_2(1)=2$ from which it follows that:

$$\left(\frac{\Delta P_{00}}{k} - \frac{\Delta R}{k'}\right) = 0$$

$$\left(\frac{\Delta P_{10}}{k} - \frac{\Delta R}{k'}\right) = \frac{1}{2k}(\theta_2 - \theta_1)$$

$$\left(\frac{\Delta P_{01}}{k} - \frac{\Delta R}{k'}\right) = \frac{1}{k}(\theta_2 - \theta_1)$$

$$\left(\frac{\Delta P_{11}}{k} - \frac{\Delta R}{k'}\right) = \frac{3}{2k}(\theta_2 - \theta_1)$$

As it may be seen, the four aforesaid quantities are different, and therefore can be recognized.

Similarly to the above reported example, other value allocations are obviously possible.

Figure 4:
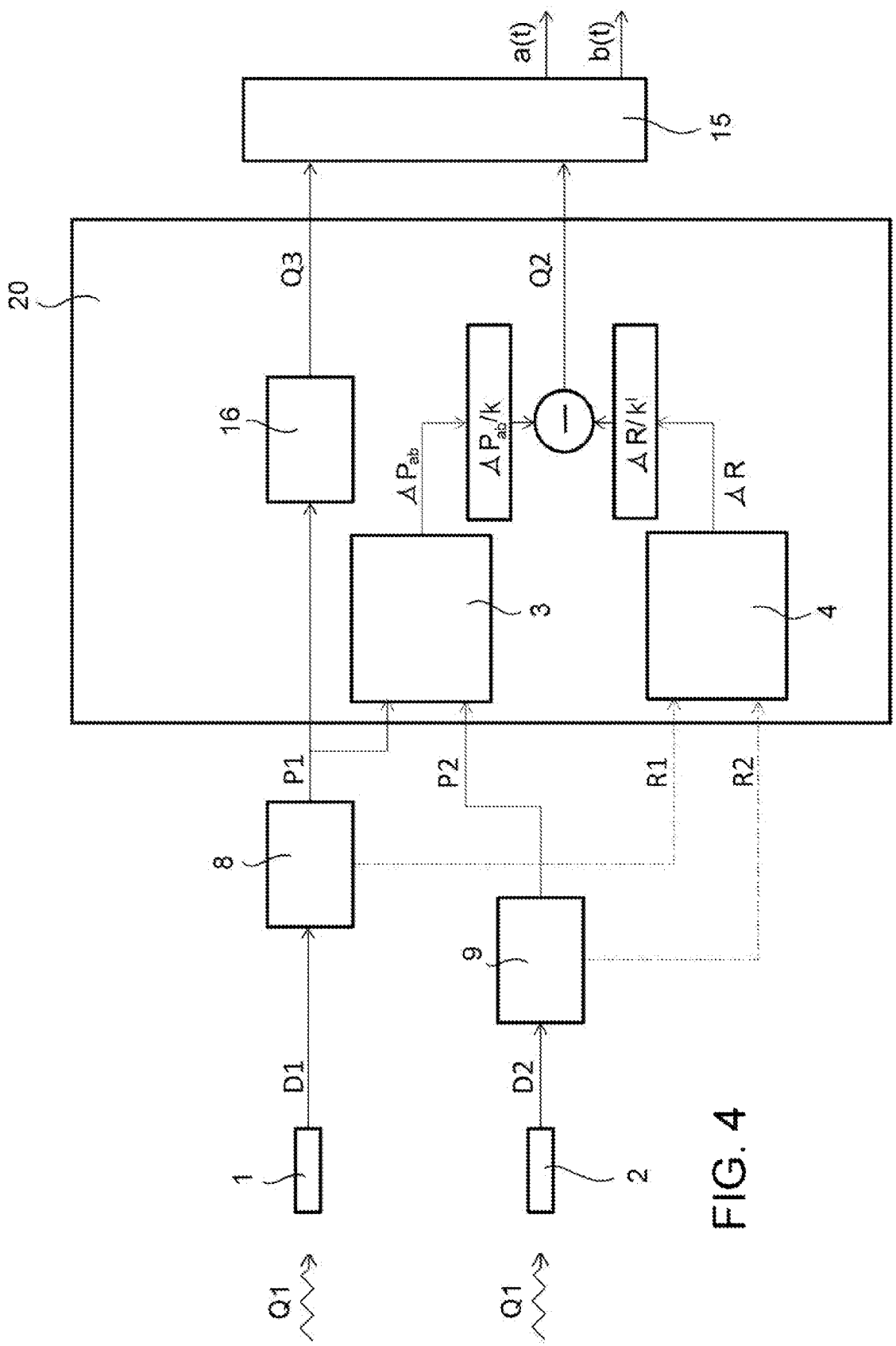
FIG. 4 shows a simplified diagram of a receiving portion of an embodiment of the telecommunication system in accordance with the invention; such a FIG. 4 simultaneously shows some other steps of the corresponding method.

It should be noted that angular momentum modulation is similar, in many respects, to amplitude modulation, and that the block diagrams shown in FIGS. 3 and 4 also apply to angular momentum modulation, with the only obvious difference that modulators modulate the angular momentum and not the amplitude. Furthermore, the threshold detector of FIGS. 4 and 5 is not necessary in this case.

Figure 2:
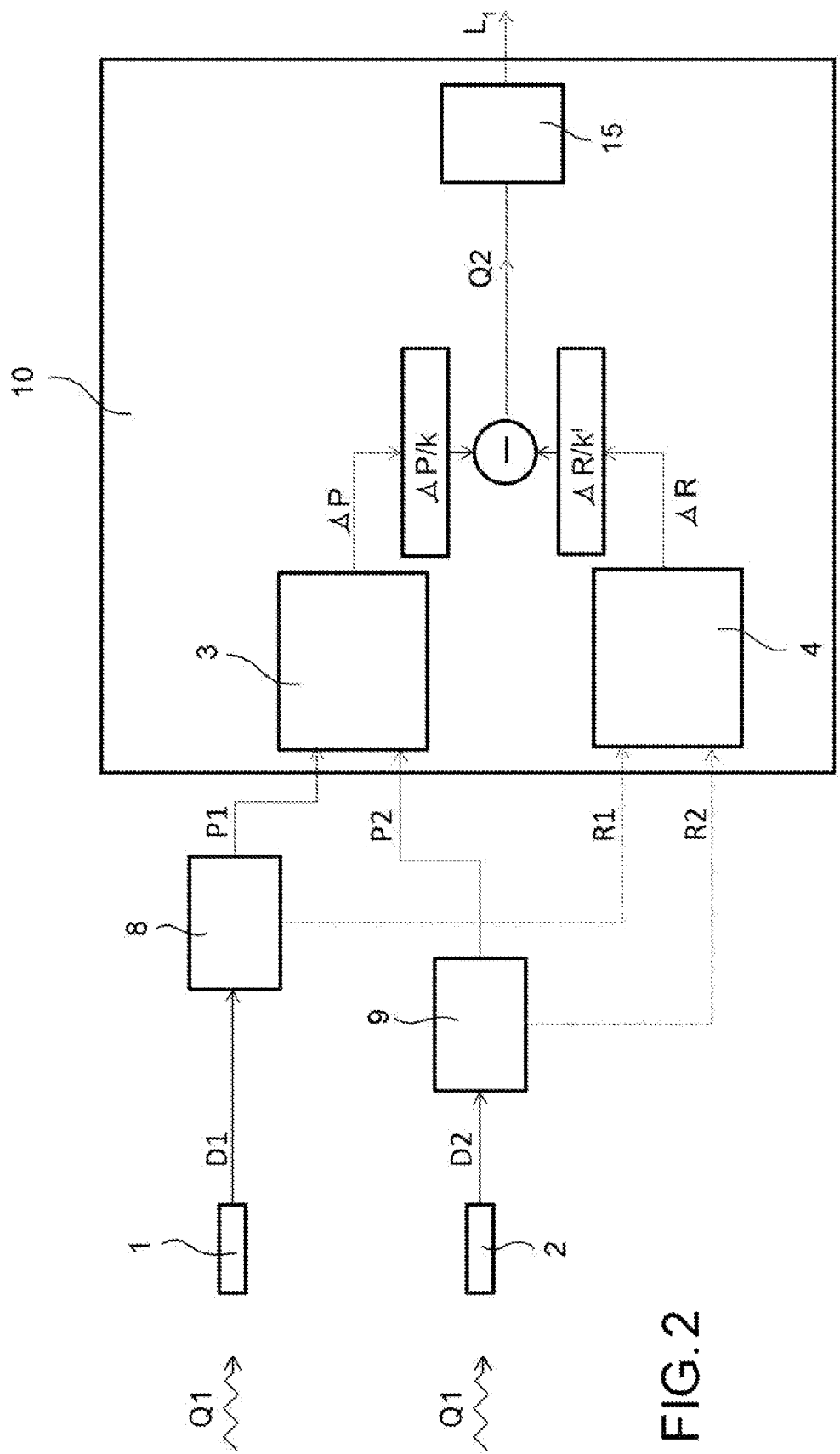
FIG. 2 shows a simplified diagram of a receiving portion of an embodiment of the system for transmitting and receiving an electromagnetic radiation beam, in accordance with the invention; such a FIG. 2 simultaneously shows some other steps of the corresponding method.

With reference to FIGS. 1 and 2, a system for transmitting and receiving an electromagnetic radiation beam is now described, adapted to determine an orbital angular momentum of the received electromagnetic radiation beam.

Such a system comprises means 5 for generating a main electromagnetic radiation beam F1, means 6 for generating a reference electromagnetic radiation beam F0, means for generating 7 and transmitting 14 a composite electromagnetic radiation beam Q1 (shown in FIG. 1), means for receiving the composite electromagnetic radiation beam, first beam detection means 1, second beam detection means 2, first frequency discrimination means 8, second frequency discrimination means 9, and means 10 for determining the orbital angular momentum (shown in FIG. 2).

The means 5 for generating a main electromagnetic radiation beam are configured to generate a main electromagnetic radiation beam F1 characterized by a first orbital angular momentum $L_1$, a first spectrum in a first frequency band, and a first beam radius of curvature.

The means 6 for generating a reference electromagnetic radiation beam are configured to generate a reference electromagnetic radiation beam F0, characterized by a second orbital angular momentum $L_0$, a second spectrum in a second frequency band which is distinct from said first frequency band, and a second beam radius of curvature substantially coinciding with said first beam radius of curvature.

The means for generating 7 and transmitting 14 a composite electromagnetic radiation beam are configured to generate a composite electromagnetic radiation beam Q1, consisting of the superposition of the aforesaid main beam F1 and reference beam F0, and for transmitting such a generated composite electromagnetic radiation beam Q1.

The means for receiving the composite electromagnetic radiation beam comprise first beam detection means 1, located in a first position, configured to generate a first composite beam electrical signal D1, representative of the electric and/or magnetic field and/or of the intensity of the electromagnetic radiation of the composite beam in the first position; and second beam detection means 2, located in a second position, which are different with respect to the aforesaid first position, configured to generate a second composite beam electrical signal D2, representative of the electric and/or magnetic field and/or of the intensity of the electromagnetic radiation of the composite beam in the second position.

The first frequency discrimination means 8 are configured to perform a frequency discrimination of the first composite beam electrical signal D1 to obtain a first main beam electrical signal P1, representative of the electric and/or magnetic field and/or of the intensity due to the main beam in the first position, and a first reference beam electrical signal R1, representative of the electric and/or magnetic field and/or of the intensity due to the reference beam in the first position.

The second frequency discrimination means 9 are configured to perform a frequency discrimination of the second composite beam electrical signal to obtain a second main beam electrical signal P2, representative of the electric and/or magnetic field and/or of the intensity due to the main beam in the second position, and a second reference beam electrical signal R2, representative of the electric and/or magnetic field and/or of the intensity due to the reference beam in the second position.

The means 10 for determining the orbital angular momentum are configured to determine the orbital angular momentum $L_1$ of the main electromagnetic radiation beam and/or the spatial phase variation of the main electromagnetic radiation beam due to the main beam orbital angular momentum $L_1$, based on the aforesaid main beam first electrical signal P1, second main beam electrical signal P2, first reference beam electrical signal R1 and second reference beam electrical signal R2.

In accordance with different implementation options, the system is configured to perform a method for transmitting and receiving an electromagnetic radiation beam according to any of the embodiments described above.

In accordance with an embodiment of the system, the means 5 for generating a main electromagnetic radiation beam and the means 6 for generating a reference electromagnetic radiation beam comprise one or more sources or transmitters of electromagnetic beams which are known per se (for example, in an implementation option, a laser).

In accordance with an implementation option, the means 5 for generating a main electromagnetic radiation beam further comprise an amplitude and/or frequency and/or phase modulator 50 and/or one or more angular momentum modulators 50 (such angular momentum modulators 50 may be, for example, spatial light modulators).

In accordance with an embodiment of the system, the means 7 for generating a composite electromagnetic radiation beam comprise an electromagnetic beam combiner with two or more inputs and an output, which are known per se (for example, a beam combiner).

In accordance with an embodiment of the system, the first beam detection means 1 comprise one or more diaphragms (optical openings), or an antenna or a group of antennas or any other electromagnetic beam receiver, which are known per se, adapted to operate at the frequencies of the first and second beam. The means for transmitting an electromagnetic beam 14 comprise for example one or more transmission antennas.

In accordance with an embodiment of the system, the second beam detection means 2 comprise one or more diaphragm (optical openings), or an antenna or a group of antennas or any other electromagnetic beam receiver, which are known per se, adapted to operate at the frequencies of the first and second beam.

In accordance with different implementations, the first frequency discrimination means 8 and the second frequency discrimination means 9 may comprise frequency filters, which are known per se.

In accordance with an embodiment of the system, the means 10 for determining the orbital angular momentum comprise at least two phase comparators 3, 4 and at least one processor 15, configured to derive the orbital angular momentum by means of processing (according, for example, to the formulae previously shown), based on the output signals from the phase comparators.

In accordance with an embodiment of the system, the means 10 for determining the orbital angular momentum comprise at least two correlators 11, 12 and at least one processor 15, configured to derive the orbital angular momentum by means of processing (according, for example, to the formulae previously shown), based on the output signals from the correlators.

Figure 5:
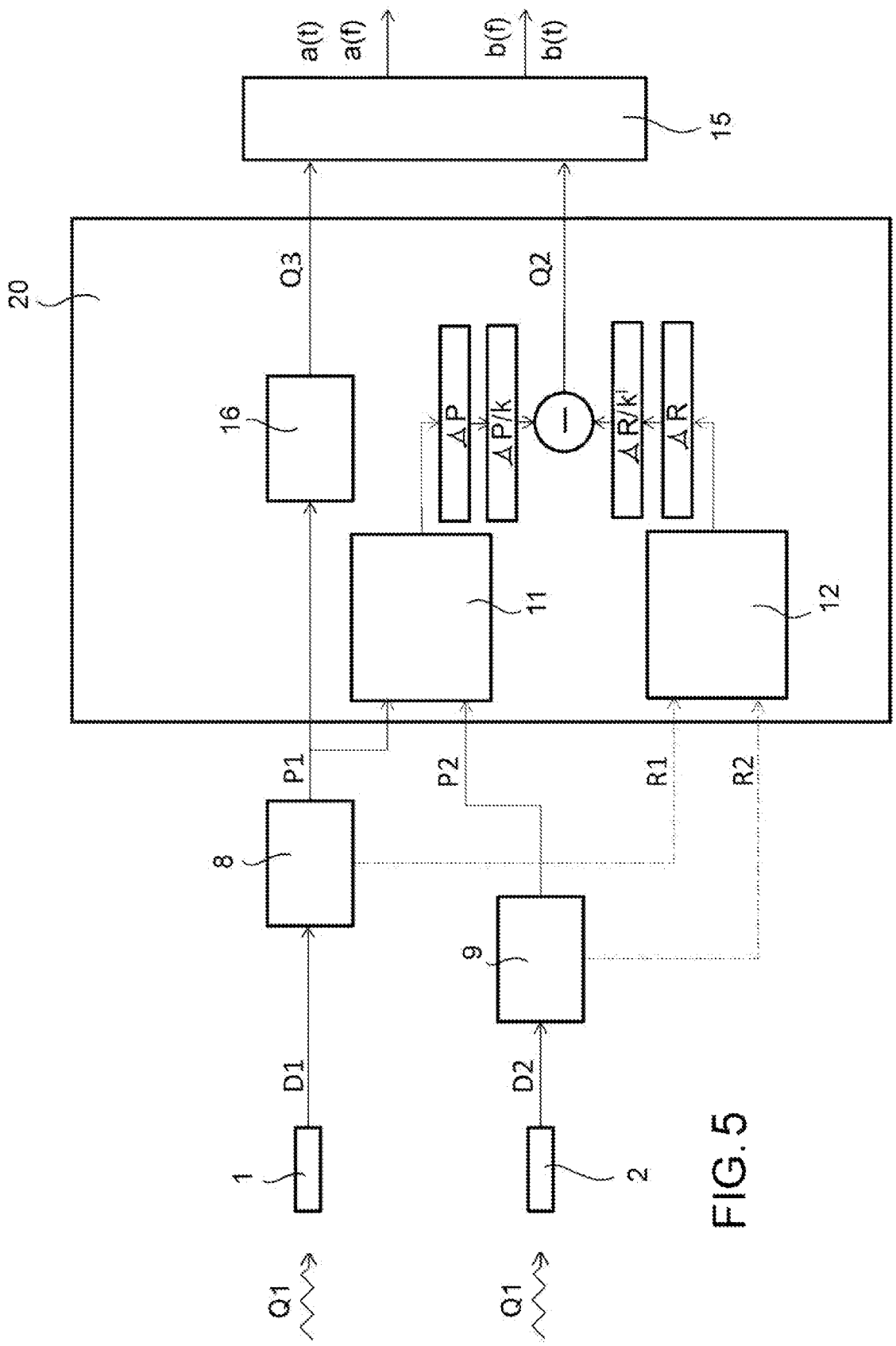
FIG. 5 shows an embodiment of the systems in accordance with the invention, comprising correlators.

Further details are provided herein, with reference to FIG. 5, with regard to the implementation option which involves the use of a correlator.

In this case, instead of using a phase comparator which provides a value proportional to the phase difference $\Delta P$ or $\Delta R$, a correlator is used which provides a value proportional to the cosine of the phase difference $\cos(\Delta P)$ or $\cos(\Delta R)$. The phase difference is then determined by the inverse function:

$$\Delta P = \arccos[\cos(\Delta P)]$$

$$\Delta R = \arccos[\cos(\Delta R)]$$

The correlation may be determined by means of the direct product of the fields or signals representative at P1 and P2 or at R1 and R2.

Alternatively, the correlation may be determined by means of interference, by measuring the average intensity $\langle 1 \rangle$ of the interference between the fields at P1 and P2, having intensity $l_{P1}$ and $l_{P2}$, respectively, or at R1 and R2, having intensity $l_{R1}$ and $l_{R2}$, respectively, knowing that:

$$\cos(\Delta P) = (\langle 1 \rangle - l_{P1} - l_{P2})/(2(l_{P1}l_{P2})^{1/2})$$

$$\cos(\Delta R) = (\langle 1 \rangle - l_{R1} - l_{R2})/(2(l_{R1}l_{R2})^{1/2})$$

In accordance with an embodiment of the aforesaid system, the transmitted and received electromagnetic beams mentioned above are optical beams and/or laser beams.

With reference to FIGS. 3 and 4, a system for performing a telecommunication of modulated signals according to any known modulation technique and grouped by means of multiplexing in the orbital angular momentum variable is now described.

Such a system comprises means 5, 6 for generating an electromagnetic beam, modulation means 50, beam combination and/or superposition means 7, transmission means 14, beam reception means 1, 2, 8, 9, phase determination means 20 and processing means 15.

The means 5, 6 for generating an electromagnetic beam are configured to generate a first electromagnetic radiation beam F1 characterized by a first orbital angular momentum $L_1$, and to generate at least one second electromagnetic radiation beam F2 characterized by at least one respective second orbital angular momentum $L_2$.

Both the first electromagnetic radiation beam F1 and the at least one second electromagnetic radiation beam F2 have respective spectra in the same first frequency band, and furthermore have respective radii of curvature substantially coinciding with a first beam radius-of-curvature value.

The means 5, 6 for generating an electromagnetic beam are further configured to generate a reference electromagnetic radiation beam F0, characterized by a second orbital angular momentum $L_0$, a second spectrum in a second frequency band which is distinct from the aforesaid first frequency band, and a second beam radius of curvature having a value substantially coinciding with the aforesaid first beam radius-of-curvature value.

The modulation means 50 are configured to modulate a first piece of information to be transmitted, represented by a first modulation function a(t), on the first electromagnetic radiation beam F1, by means of any amplitude and/or phase and/or frequency modulation technique, to obtain a first modulated beam Fm1; modulate at least one second piece of information to be transmitted, represented by a second modulation function b(t), on the at least one second electromagnetic radiation beam F2, by means of any amplitude and/or phase and/or frequency modulation technique, to obtain a second modulated beam Fm2.

The beam combination and/or superposition means 7 are configured to superimpose and/or combine the aforesaid reference beam F0, first modulated beam Fm1 and second modulated beam Fm2 to generate a composite electromagnetic radiation beam Q1, consisting of the superposition of the reference beam and a main beam, in turn consisting of the superposition of the aforesaid first modulated beam Fm1 and at least one second modulated beam Fm2.

The transmission means 14 are configured to transmit the aforesaid generated composite electromagnetic radiation beam.

The means for receiving the composite electromagnetic radiation beam comprise first beam detection means 1, second beam detection means 2, first frequency discrimination means 8, second frequency discrimination means 9.

The first beam detection means 1 are located in a first position, and are configured to generate a first composite beam electrical signal D1, representative of the electric and/or magnetic field and/or of the intensity of the electromagnetic radiation of the composite beam in the first position.

The second beam detection means 2 are located in a second position, which is different with respect to the first position and are configured to generate a second composite beam electrical signal D2, representative of the electric and/or magnetic field and/or of the intensity of the electromagnetic radiation of the composite beam in the second position.

The first frequency discrimination means 8 are configured to perform a frequency discrimination of the first composite beam electrical signal D1 to obtain a first main beam electrical signal P1, representative of the electric and/or magnetic field and/or of the intensity due to the main beam in the first position, and a first reference beam electrical signal R1, representative of the electric and/or magnetic field and/or of the intensity due to the reference beam in the first position.

The second frequency discrimination means 9 are configured to perform a frequency discrimination of the second composite beam electrical signal to obtain a second main beam electrical signal P2, representative of the electric and/or magnetic field and/or of the intensity due to the main beam in the second position, and a second reference beam electrical signal R2, representative of the electric and/or magnetic field and/or of the intensity due to the reference beam in the second position.

The phase determination means 20 are configured to determine the phase of the first main beam electrical signal P1 and the phase of the second main beam electrical signal P2, and also to determine the phase of the first reference beam electrical signal R1 and the phase of the second reference beam electrical signal R2.

The phase determination means 20 are further configured to determine a first phase difference value $\Delta P_{ab}$ corresponding to the difference between the phase of the first main beam electrical signal P1 and the phase of the second main beam electrical signal P2, in which such a first phase difference value $\Delta P_{ab}$ is dependent on the values taken by the first modulation function a(t) and the second modulation function b(t); and, furthermore, determining a second phase difference value $\Delta R$ corresponding to the difference between the phase of the first reference beam electrical signal R1 and the phase of the second reference beam electrical signal R2; and, furthermore, subtracting the second phase difference value $\Delta R$, divided by a wave number k', from the first phase difference value $\Delta P_{ab}$, divided by a wave number k, to obtain a difference value $Q2=\Delta P_{ab}/k - \Delta R/k'$. The first wave number k is the wave number corresponding to the main beam, defined as $k=2\pi/\lambda$, $\lambda$ being the wavelength of the aforesaid main beam belonging to the aforesaid first frequency band. The second wave number k' is the wave number corresponding to the reference beam, defined as $k'=2\pi/\lambda'$, $\lambda'$ being the wavelength of the aforesaid reference beam belonging to the aforesaid second frequency band.

The aforesaid difference value $Q2=\Delta P_{ab}/k - \Delta R/k'$ is representative of a combination of values taken by the first modulation function a(t) and the second modulation function b(t), while it is independent of positional inclination conditions between the first detector 1 and the second detector 2 and independent of phase variations due to disturbances suffered by the transmitted composite beam before reception.

The processing means 15 are configured to demultiplex and demodulate the modulated information on each of the first modulated beam Fm1 and the at least one second modulated beam Fm2, based on the aforesaid determined difference value $Q2=\Delta P_{ab}/k - \Delta R/k'$.

In accordance with different implementations, the system is configured to perform an electromagnetic radiation beam telecommunication method according to any of the embodiments described above.

In accordance with an embodiment of the system, the means 5, 6 for generating an electromagnetic beam comprise one or more sources or transmitters of electromagnetic beams which are known per se (for example, in an implementation option, a laser).

In accordance with an embodiment of the system, the modulation means 50 comprise amplitude and/or frequency and/or phase and/or angular momentum modulators which are known per se.

In accordance with an embodiment of the system, the first and second beam detection means 1, 2 comprise one or more diaphragm (optical openings), or an antenna or a group of antennas or any other electromagnetic beam receiver, which are known per se, adapted to operate at the frequencies of the first and second beam, respectively.

In accordance with an embodiment of the system, the first and second frequency discrimination means 8, 9 comprise frequency filters, which are known per se.

In accordance with an embodiment of the system, the phase determination means 20 comprise at least two phase comparators 3, 4, which are known per se.

In accordance with an embodiment of the system, the first and second frequency discrimination means comprise correlators 11, 12, which are known per se. With regard to such correlators, the same considerations, illustrated above with reference to the system for transmitting and receiving electromagnetic beams, apply.

In accordance with an embodiment of the system, the processing means 15 comprise one or more processors, which are known per se, and the related software.

In accordance with an embodiment of the aforesaid system, the transmitted and received electromagnetic beams mentioned above are optical beams and/or laser beams.

As it may be noticed, the object of the present invention is fully achieved by the systems and methods shown above, by virtue of the functional and structural features thereof.

In fact, the system and method for transmitting and receiving electromagnetic beams, illustrated above, is capable of detecting, precisely and reliably, the orbital angular momentum of the received beam, in a manner independent of the positional tilts of the receivers and independent of the distortions suffered by the beam during propagation.

This is achieved by virtue of a double spatial detection, in two different points, of a composite beam, comprising, in addition to the beam to be investigated, also a further reference beam.

The possibility of precisely and reliably detecting the orbital angular momentum of the received beam is, in turn, advantageously applicable in a plurality of different applications, including, for example, the characterization of the beam and the utilization of the angular momentum variable for telecommunications purposes.

With reference to telecommunication applications, the method and the system of the present invention allow to utilize the orbital angular momentum variable as an additional degree of freedom, advantageously usable both for modulating signals and for multiplexing the same.

In particular, the orbital angular momentum provides an additional level of multiplexing (with consequent, apparent advantages), allowing to group signals which are identical from the point of view of the other multiplexing variables (for example, time or frequency) and which may be discriminated based on the different orbital angular momentum.

Those skilled in the art, in order to meet contingent needs, may modify and adapt the embodiments of the systems and methods described above, and replace elements with others which are functionally equivalent, without departing from the scope of the following claims. Each of the features described as belonging to a possible embodiment may be achieved irrespective of the other embodiments described.

The invention claimed is:

1. A method for transmitting and receiving an electromagnetic radiation beam, adapted to determine an orbital angular momentum of the received electromagnetic radiation beam, comprising the steps of:
   generating at least one main electromagnetic radiation beam (F1) characterized by a first orbital angular momentum ($L_1$), a first spectrum in a first frequency band, and a first beam radius of curvature;
   generating a reference electromagnetic radiation beam (F0), characterized by a second orbital angular momentum ($L_0$), a second spectrum in a second frequency band which is distinct from said first frequency band, and a second beam radius of curvature substantially coinciding with said first beam radius of curvature;
   generating a composite electromagnetic radiation beam (Q1), consisting of the superposition of said at least one main beam (F1) and the reference beam (F0);
   transmitting said generated composite electromagnetic radiation beam (Q1);
   receiving said composite electromagnetic radiation beam, by means of a first beam detector (1) located in a first position, to generate a first composite beam electrical signal (D1), representative of the electric and/or magnetic field and/or of the intensity of the electromagnetic radiation of the composite beam in said first position;
   receiving said composite electromagnetic radiation beam, by means of a second beam detector (2) located in a second different position with respect to said first position, to generate a second composite beam electrical signal (D2), representative of the electric and/or magnetic field and/or of the intensity of the received electromagnetic radiation of the composite beam in said second position;
   performing a frequency discrimination of said first composite beam electrical signal (D1) with reference to said first frequency band and second frequency band to obtain, respectively, a first main beam electrical signal (P1), representative of the electric and/or magnetic field and/or of the intensity due to the main beam in said first position, and a first reference beam electrical signal (R1), representative of the electric and/or magnetic field and/or of the intensity due to the reference beam in said first position;
   performing a frequency discrimination of said second composite beam electrical signal (D2) with reference to said first frequency band and second frequency band to obtain, respectively, a second main beam electrical signal (P2), representative of the electric and/or magnetic field and/or of the intensity due to the main beam in said second position, and a second reference beam electrical signal (R2), representative of the electric and/or magnetic field and/or of the intensity due to the reference beam in said second position;
   determining the orbital angular momentum ($L_1$) of the main electromagnetic radiation beam and/or the spatial phase variation of the main electromagnetic radiation beam due to said main beam orbital angular momentum ($L_1$), based on said first main beam electrical signal (P1), second main beam electrical signal (P2), first reference beam electrical signal (R1) and second reference beam electrical signal (R2).

2. The method according to claim 1, wherein the determining step comprises:
   determining a first phase difference value ($\Delta P$) corresponding to the difference between the phase of the first main beam electrical signal (P1) and the phase of the second main beam electrical signal (P2),
   determining a second phase difference value ($\Delta R$) corresponding to the difference between the phase of the first reference beam electrical signal (R1) and the phase of the second reference beam electrical signal (R2),
   subtracting the second phase difference value ($\Delta R$), divided by a second wave number (k'), from the first phase difference value ($\Delta P$), divided by a first wave number (k), to obtain a difference value ($Q2=\Delta P/k-\Delta R/k'$) which is independent of positional inclination conditions between said first detector and second detector, deriving from the relative position of the two detectors with respect to the beam propagation, and which is independent of phase variations due to disturbances suffered by the transmitted composite beam before reception,
   where the first wave number (k) is the wave number corresponding to the main beam, defined as $k=2\pi/\lambda$, $\lambda$ being the wavelength of said main beam, and where the second wave number (k') is the wave number corresponding to the reference beam, defined as $k'=2\pi/\lambda'$, $\lambda'$ being the wavelength of said reference beam;
   determining the orbital angular momentum of the main electromagnetic radiation beam based on said obtained difference value ($Q2=\Delta P/k-\Delta R/k'$).

3. The method according to claim 2, wherein the step of determining the orbital angular momentum of the main electromagnetic radiation beam comprises:
   determining the orbital angular momentum of the main electromagnetic radiation beam based on the formula $$\Delta P/k - \Delta R/k' \propto (L_1/k - L_0/k')(\theta_2 \theta_1)$$

where $\theta_1$ is the angular position of the first detector measured on the plane orthogonal to the composite beam propagation vector containing the first detector, and $\theta_2$ is the angular position of the second detector measured on the plane orthogonal to the composite beam propagation vector containing the second detector.

4. The method according to claim 2, wherein:
   the step of determining a first phase difference value ($\Delta P$) comprises comparing the phase of the first main beam electrical signal (P1) with the phase of the second main beam electrical signal (P2), by means of a first phase comparator (3);
   the step of determining a second phase difference value ($\Delta R$) comprises comparing the phase of the first reference beam electrical signal (R1) with that of the second reference beam electrical signal (R2), by means of a second phase comparator (4).

5. The method according to claim 2, wherein:
the step of determining a first phase difference value ($\Delta P$) comprises performing correlation operations between the first main beam electrical signal (P1) and the second main beam electrical signal (P2);
the step of determining a second phase difference value ($\Delta R$) comprises performing correlation operations between the first reference beam electrical signal (R1) and the second reference beam electrical signal (R2).

6. The method according to claim 1, wherein the orbital angular momentum of the reference beam is known at all times, and/or wherein the orbital angular momentum of the reference beam takes the constant value L0=0.

7. The method according to claim 1, wherein the first position of the first detector and the second position of the second detector are fixed and constant, and are distinct from the position of the singularity point of the vortex of the beam.

8. The method according to claim 1, wherein the first position of the first detector and/or the second position of the second detector are movable, and the reciprocal relationship between said first position and second position is known at all times.

9. The method according to claim 1, wherein the second frequency band is substantially monochromatic, and/or wherein the second frequency band is adjacent to the first frequency band.

10. The method according to claim 1, wherein the steps of performing a frequency discrimination of the first or second composite beam electrical signal comprise:
performing a frequency filtering; or
performing a frequency separation by means of heterodyne techniques or other frequency separation methods.

11. The method according to claim 1, wherein the at least one main electromagnetic radiation beam is not modulated, or wherein the at least one main electromagnetic radiation beam is amplitude modulated, and/or phase modulated, and/or frequency modulated, and/or orbital angular momentum modulated.

12. The method according to claim 1, wherein the transmitted and received electromagnetic beams are optical beams and/or laser beams.

13. A method for performing a telecommunication of modulated signals according to any known modulation technique and grouped by means of multiplexing in the orbital angular momentum variable, comprising the steps of:
generating a first electromagnetic radiation beam (F1) characterized by a first orbital angular momentum ($L_1$), and generating at least one second electromagnetic radiation beam (F2) characterized by at least one respective second orbital angular momentum ($L_2$),
wherein both the first electromagnetic radiation beam (F1) and the at least one second electromagnetic radiation beam (F2) have respective spectra in the same first frequency band, and furthermore have respective radii of curvature substantially coinciding with a first beam radius-of-curvature value;
modulating a first piece of information to be transmitted, represented by a first modulation function a(t), on the first electromagnetic radiation beam (F1), by means of any modulation technique, to obtain a first modulated beam (Fm1);
modulating at least one second piece of information to be transmitted, represented by a second modulation function b(t), on the at least one second electromagnetic radiation beam (F2), by means of any modulation technique, to obtain a second modulated beam (Fm2);
generating a reference electromagnetic radiation beam (F0), characterized by a second orbital angular momentum ($L_0$), a second spectrum in a second frequency band which is distinct from said first frequency band, and a second beam radius of curvature having a value substantially coinciding with said first beam radius-of-curvature value;
superimposing and/or combining said reference beam (F0), first modulated beam (Fm1) and second modulated beam (Fm2) to generate a composite electromagnetic radiation beam (Q1), consisting of the superposition of the reference beam (F0) and a main beam, in turn consisting of the superposition of said first modulated beam (Fm1) and at least one second modulated beam (Fm2);
transmitting said generated composite electromagnetic radiation beam (Q12);
receiving said composite electromagnetic radiation beam, by means of a first beam detector located in a first position, to generate a first composite beam electrical signal (D1), representative of the electric and/or magnetic field and/or of the intensity of the electromagnetic radiation of the composite beam in said first position;
receiving said composite electromagnetic radiation beam, by means of a second beam detector located in a second different position with respect to said first position, to generate a second composite beam electrical signal (D2), representative of the electric and/or magnetic field and/or of the intensity of the received electromagnetic radiation of the composite beam in said second position;
performing a frequency discrimination of said first composite beam electrical signal (D1) with reference to said first frequency band and second frequency band to obtain, respectively, a first main beam electrical signal (P1), representative of the electric and/or magnetic field and/or of the intensity due to the main beam in said first position, and a first reference beam electrical signal (R1), representative of the electric and/or magnetic field and/or of the intensity due to the reference beam in said first position;
performing a frequency discrimination of said second composite beam electrical signal (D2) with reference to said first frequency band and second frequency band to obtain, respectively, a second main beam electrical signal (P2), representative of the electric and/or magnetic field and/or of the intensity due to the main beam in said second position, and a second reference beam electrical signal (R2), representative of the electric and/or magnetic field and/or of the intensity due to the reference beam in said second position;
determining the phase of the first main beam electrical signal (P1) and the phase of the second main beam electrical signal (P2);
determining the phase of the first reference beam electrical signal (R1) and the phase of the second reference beam electrical signal (R2);
determining a first phase difference value ($\Delta P_{ab}$) corresponding to the difference between the phase of the first main beam electrical signal (P1) and the phase of the second main beam electrical signal (P2), said first phase difference value ($\Delta P_{ab}$) being dependent on the values taken by the first modulation function a(t) and the second modulation function b(t);

determining a second phase difference value (ΔR) corresponding to the difference between the phase of the first reference beam electrical signal (R1) and the phase of the second reference beam electrical signal (R2);

subtracting the second phase difference value (ΔR), divided by a second wave number k', from the first phase difference value ($\Delta P_{ab}$), divided by a first wave number k, to obtain a difference value (Q2=$\Delta P_{ab}$/k−ΔR/k'), where the first wave number (k) is the wave number corresponding to the main beam, defined as k=2π/λ, λ being the wavelength of the main beam, and where the second wave number (k') is the wave number corresponding to the reference beam, defined as k'=2π/λ', λ' being the wavelength of the reference beam, said difference value (Q2=$\Delta P_{ab}$/k−ΔR/k') being representative of a combination of values taken by the first modulation function a(t) and the second modulation function b(t), while being independent of positional inclination conditions between said first detector and second detector and independent of phase variations due to disturbances suffered by the transmitted composite beam before reception;

demultiplexing and demodulating the information modulated on each of the first modulated beam (Fm1) and the at least one second modulated beam (Fm2), based on said determined difference value (Q2=$\Delta P_{ab}$/k−ΔR/k').

14. The method according to claim 13, wherein the number of modulated beams, which are orbital angular momentum multiplexed, is more than two.

15. The method according to claim 13, wherein the first electromagnetic radiation beam (F1) and the at least one second electromagnetic radiation beam (F2) are digitally amplitude modulated, in accordance with the amplitudes of the first modulation function a(t) and the at least one second modulation function b(t), and wherein the difference value (Q2=$\Delta P_{ab}$/k−ΔR/k') may take a plurality of expected values, each representative of a respective combination of digital amplitude values taken by the first modulation function a(t) and the at least one second modulation function b(t).

16. The method according to claim 15, wherein:

the first electromagnetic radiation beam (F1) and the at least one second electromagnetic radiation beam (F2) are digitally amplitude modulated, in a binary manner, and the amplitudes of the first modulation function a(t) and the at least one second modulation function b(t) may take the logical values 0 or 1;

the method comprises the further step of detecting the received power or intensity (Q3) corresponding to the first main beam electrical signal (P1) or the second main beam electrical signal (P2), and comparing the power or intensity received with a minimum threshold;

the determined difference (Q2=ΔPab/k−ΔR/k') may take a first expected value ($\Delta P_{10}$/k−ΔR/k') which is dependent on the first angular momentum (L1), or a second expected value ($\Delta P_{01}$/k−ΔR/k') which is dependent on the second angular momentum (L2), or a third expected value ($\Delta P_{11}$/k−ΔR/k') which is dependent on a combination of the first and second angular momentums;

the step of demodulating, demultiplexing and demodulating the modulated information comprises:

recognizing that the first modulated beam (Fm1) carries information corresponding to 1 and the second modulated beam (Fm2) carries information corresponding to 0 if the determined difference (ΔPab/k−ΔR/k') takes said first expected value ($\Delta P_{10}$/k−ΔR/k');

recognizing that the first modulated beam (Fm1) carries information corresponding to 0 and the second modulated beam (Fm2) carries information corresponding to 1 if the determined difference (ΔPab/k−ΔR/k') takes said second expected value ($\Delta P_{01}$/k−ΔR/k');

recognizing that the first modulated beam (Fm1) carries information corresponding to 1 and the second modulated beam (Fm2) carries information corresponding to 1 if the determined difference (ΔPab/k−ΔR/k') takes said third expected value ($\Delta P_{11}$/k−ΔR/k');

recognizing that the first modulated beam (Fm1) carries information corresponding to 0 and the second modulated beam (Fm2) carries information corresponding to 0 if the received power or intensity (Q3) is lower than said minimum threshold.

17. The method according to claim 13, wherein the first electromagnetic radiation beam (F1) and the at least one second electromagnetic radiation beam (F2) are digitally angular momentum modulated, wherein the angular momentum of the first beam (F1) takes two different discrete values based on a first modulation function a(t) and the angular momentum of the at least one second beam (F2) takes two different discrete values based on at least one respective second modulation function b(t), and wherein the difference value (Q2=ΔPab/k−ΔR/k') may take a plurality of expected values, each representative of a respective combination of digital amplitude values taken by the first modulation function a(t) and the at least one second modulation function b(t).

18. The method according to claim 17, wherein:

the amplitudes of the first modulation function a(t) and the at least one second modulation function b(t) may take the logical values 0 or 1;

the determined difference ($\Delta P_{ab}$/k−ΔR/k') may take:

a first expected value ($\Delta P_{10}$/k−ΔR/k') when the first modulation function a(t) takes a value 1 and the second modulation function takes a value 0; or a second expected value ($\Delta P_{01}$/k−ΔR/k') when the first modulation function a(t) takes a value 0 and the second modulation function takes a value 1; or a third expected value ($\Delta P_{11}$/k−ΔR/k') when the first modulation function a(t) takes a value 1 and the second modulation function takes a value 1; or a fourth expected value ($\Delta P_{00}$/k−ΔR/k') when the first modulation function a(t) takes a value 0 and the second modulation function takes a value 0;

the step of demodulating, demultiplexing and demodulating the modulated information comprises:

recognizing that the first modulated beam (Fm1) carries information corresponding to 1 and the second modulated beam (Fm2) carries information corresponding to 0 if the determined difference ($\Delta P_{ab}$/k−ΔR/k') takes said first expected value ($\Delta P_{10}$/k−ΔR/k');

recognizing that the first modulated beam (Fm1) carries information corresponding to 0 and the second modulated beam (Fm2) carries information corresponding to 1 if the determined difference ($\Delta P_{ab}$/k−ΔR/k') takes said second expected value ($\Delta P_{01}$/k−ΔR/k');

recognizing that the first modulated beam (Fm1) carries information corresponding to 1 and the second modulated beam (Fm2) carries information corresponding to 1 if the determined difference ($\Delta P_{ab}$/k−ΔR/k') takes said third expected value ($\Delta P_{11}$/k−ΔR/k');

recognizing that the first modulated beam (Fm1) carries information corresponding to 0 and the second modulated beam (Fm2) carries information corresponding to 0 if the determined difference ($\Delta P_{ab}/k - \Delta R/k'$) takes said fourth expected value ($\Delta P_{00}/k - \Delta R/k'$).

19. A system for transmitting and receiving an electromagnetic radiation beam, adapted to determine an orbital angular momentum of the received electromagnetic radiation beam, comprising:
- means for generating a main electromagnetic radiation beam, configured to generate a main electromagnetic radiation beam (F1) characterized by a first orbital angular momentum (L1), a first spectrum in a first frequency band, and a first beam radius of curvature;
- means for generating a reference electromagnetic radiation beam, configured to generate a reference electromagnetic radiation beam (F0), characterized by a second orbital angular momentum (L0), a second spectrum in a second frequency band which is distinct from said first frequency band, and a second beam radius of curvature substantially coinciding with said first beam radius of curvature;
- means for generating a composite electromagnetic radiation beam, configured to generate a composite electromagnetic radiation beam (Q1), consisting of the superposition of said main beam (F1) and reference beam (F2), and means for transmitting a composite electromagnetic radiation beam, configured to transmit said generated composite electromagnetic radiation beam (Q1);
- means for receiving the composite electromagnetic radiation beam, comprising:
- first beam detection means, located in a first position, configured to generate a first composite beam electrical signal (D1), representative of the electric and/or magnetic field and/or of the intensity of the electromagnetic radiation of the composite beam in said first position;
- second beam detection means, located in a second position, which are different with respect to said first position, configured to generate a second composite beam electrical signal (D2), representative of the electric and/or magnetic field and/or of the intensity of the electromagnetic radiation of the composite beam in said second position;
- first frequency discrimination means, configured to perform a frequency discrimination of said first composite beam electrical signal (D1) with reference to said first frequency band and second frequency band to obtain, respectively, a first electrical main beam signal (P1), representative of the electric and/or magnetic field and/or of the intensity due to the main beam in said first position, and a first reference beam electrical signal (R1), representative of the electric and/or magnetic field and/or of the intensity due to the reference beam in said first position;
- second frequency discrimination means, configured to perform a frequency discrimination of said second composite beam electrical signal with reference to said first frequency band and second frequency band to obtain, respectively, a second main beam electrical signal (P2), representative of the electric and/or magnetic field and/or of the intensity due to the main beam in said second position, and a second reference beam electrical signal (R2), representative of the electric and/or magnetic field and/or of the intensity due to the reference beam in said second position;
- means for determining the orbital angular momentum, configured to determine the orbital angular momentum (L1) of the main electromagnetic radiation beam and/or the spatial phase variation of the main electromagnetic radiation beam due to the main beam orbital angular momentum (L1), based on said first main beam electrical signal (P1), second main beam electrical signal (P2), first reference beam electrical signal (R1) and second reference beam electrical signal (R2).

20. The system according to claim 19, wherein the means for determining the orbital angular momentum are further configured to:
- determine a first phase difference value ($\Delta P$) corresponding to the difference between the phase of the first main beam electrical signal (P1) and the phase of the second main beam electrical signal (P2),
- determine a second phase difference value ($\Delta R$) corresponding to the difference between the phase of the first reference beam electrical signal (R1) and the phase of the second reference beam electrical signal (R2),
- subtract the second phase difference value ($\Delta R$), divided by a second wave number (k'), from the first phase difference value ($\Delta P$), divided by a first wave number (k), to obtain a difference value ($Q2 = \Delta P/k - \Delta R/k'$) which is independent of positional inclination conditions between said first detector and second detector, deriving from the relative position of the two detectors with respect to the beam propagation, and which is independent of phase variations due to disturbances suffered by the transmitted composite beam before reception,
- where the first wave number (k) is the wave number corresponding to the main beam, defined as $k = 2\pi/\lambda$, $\lambda$ being the wavelength of said main beam, and where the second wave number (k') is the wave number corresponding to the reference beam, defined as $k' = 2\pi/\lambda'$, being the wavelength of said reference beam; and
- determine the orbital angular momentum of the main electromagnetic radiation beam based on said obtained difference value ($Q2 = \Delta P/k - \Delta R/k'$).

21. A system for performing a telecommunication of modulated signals according to any known modulation technique and grouped by means of multiplexing in the orbital angular momentum variable, comprising:
- means for generating an electromagnetic beam, configured to:
  - generate a first electromagnetic radiation beam (F1) characterized by a first orbital angular momentum ($L_1$), and generate at least one second electromagnetic radiation beam (F2) characterized by at least one respective second orbital angular momentum ($L_2$), wherein both the first electromagnetic radiation beam (F1) and the at least one second electromagnetic radiation beam (F2) have respective spectra in the same first frequency band, and furthermore have respective radii of curvature substantially coinciding with a first beam radius-of-curvature value;
  - generate a reference electromagnetic radiation beam (F0), characterized by a second orbital angular momentum ($L_0$), a second spectrum in a second frequency band which is distinct from said first frequency band, and a second beam radius of curvature having a value substantially coinciding with said first beam radius-of-curvature value;
- modulation means, configured to:
  - modulate a first piece of information to be transmitted, represented by a first modulation function a(t), on the first electromagnetic radiation beam (F1), by means of any amplitude and/or phase and/or frequency modulation technique, to obtain a first modulated beam (Fm1);

modulate at least one second piece of information to be transmitted, represented by a second modulation function b(t), on the at least one second electromagnetic radiation beam (F2), by means of any amplitude and/or phase and/or frequency modulation technique, to obtain a second modulated beam (Fm2);

beam combination and/or superposition means, configured to superimpose and/or combine said reference beam (F0), first modulated beam (Fm1) and second modulated beam (Fm2) to generate a composite electromagnetic radiation beam (Q1), consisting of the superposition of the reference beam (F0) and a main beam, in turn consisting of the superposition of said first modulated beam (Fm1) and at least one second modulated beam (Fm2);

transmission means, configured to transmit said generated composite electromagnetic radiation beam (Q1);

means for receiving the composite electromagnetic radiation beam, comprising:
  first beam detection means, located in a first position, configured to generate a first composite beam electrical signal (D1), representative of the electric and/or magnetic field and/or of the intensity of the electromagnetic radiation of the composite beam in said first position;
  second beam detection means, located in a second position, which are different with respect to said first position, configured to generate a second composite beam electrical signal (D2), representative of the electric and/or magnetic field and/or of the intensity of the electromagnetic radiation of the composite beam in said second position;
  first frequency discrimination means, configured to perform a frequency discrimination of said first composite beam electrical signal (D1) with reference to said first frequency band and second frequency band to obtain, respectively, a first main beam electrical signal (P1), representative of the electric and/or magnetic field and/or of the intensity due to the main beam in said first position, and a first reference beam electrical signal (R1), representative of the electric and/or magnetic field and/or of the intensity due to the reference beam in said first position;
  second frequency discrimination means, configured to perform a frequency discrimination of said second composite beam electrical signal with reference to said first frequency band and second frequency band to obtain, respectively, a second main beam electrical signal (P2), representative of the electric and/or magnetic field and/or of the intensity due to the main beam in said second position, and a second reference beam electrical signal (R2), representative of the electric and/or magnetic field and/or of the intensity due to the reference beam in said second position;

phase determination means, configured to:
  determine the phase of the first main beam electrical signal (P1) and the phase of the second main beam electrical signal (P2);
  determine the phase of the first reference beam electrical signal (R1) and the phase of the second reference beam electrical signal (R2);
  determine a first phase difference value ($\Delta P_{ab}$) corresponding to the difference between the phase of the first main beam electrical signal (P1) and the phase of the second main beam electrical signal (P2), said first phase difference value ($\Delta P_{ab}$) being dependent on the values taken by the first modulation function a(t) and the second modulation function b(t);
  determine a second phase difference value ($\Delta R$) corresponding to the difference between the phase of the first reference beam electrical signal (R1) and the phase of the second reference beam electrical signal (R2);
  subtract the second phase difference value ($\Delta R$), divided by a wave number k', from the first phase difference value ($\Delta P_{ab}$), to obtain a difference value (Q2=$\Delta P_{ab}$/k−$\Delta R$/k'), said difference value (Q2=$\Delta P_{ab}$/k−$\Delta R$/k') being representative of a combination of values taken by the first modulation function a(t) and the second modulation function b(t), while being independent of positional inclination conditions between said first detector and second detector and independent of phase variations due to disturbances suffered by the transmitted composite beam before reception,
  where the first wave number k is the wave number corresponding to the main beam, defined as k=$2\pi/\lambda$, $\lambda$ being the wavelength of said main beam belonging to the first frequency band, and where the second wave number k' is the wave number corresponding to the reference beam, defined as k'=$2\pi/\lambda'$, $\lambda'$ being the wavelength of said reference beam belonging to the second frequency band;

processing means, configured to demultiplex and demodulate the information modulated on each of the first modulated beam (Fm1) and the at least one second modulated beam (Fm2), based on said determined difference value (Q2=$\Delta P_{ab}$/k−$\Delta R$/k').

* * * * *